US012726989B2

(12) United States Patent
Chen et al.

(10) Patent No.: US 12,726,989 B2
(45) Date of Patent: Sep. 1, 2026

(54) DATA TRANSMISSION METHOD AND APPARATUS

(71) Applicant: HUAWEI TECHNOLOGIES CO., LTD., Shenzhen (CN)

(72) Inventors: Erkai Chen, Kista (SE); Xiang Mi, Boulogne Billancourt (FR); Shuri Liao, Shanghai (CN); Youlong Cao, Shanghai (CN); Shengyue Dou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 172 days.

(21) Appl. No.: 18/742,972

(22) Filed: Jun. 13, 2024

(65) Prior Publication Data

US 2024/0334439 A1 Oct. 3, 2024

Related U.S. Application Data

(63) Continuation of application No. PCT/CN2022/132971, filed on Nov. 18, 2022.

(30) Foreign Application Priority Data

Dec. 13, 2021 (CN) ........................ 202111523030.7

(51) Int. Cl.

*H04W 72/21* (2023.01)
*H04W 28/02* (2009.01)
*H04W 28/04* (2009.01)

(52) U.S. Cl.

CPC ....... *H04W 72/21* (2023.01); *H04W 28/0236* (2013.01); *H04W 28/04* (2013.01)

(58) Field of Classification Search

None

See application file for complete search history.

(56) References Cited

U.S. PATENT DOCUMENTS

| | | | | |
|---|---|---|---|---|
| 11,528,730 | B2 * | 12/2022 | Khoshnevisan | H04L 5/0094 |
| 12,063,179 | B2 * | 8/2024 | Shrestha | H04L 1/1812 |
| 2019/0230689 | A1 * | 7/2019 | Cao | H04L 27/2602 |
| 2021/0274526 | A1 | 9/2021 | Shin et al. | |

FOREIGN PATENT DOCUMENTS

| | | | |
|---|---|---|---|
| CN | 112534939 | A | 3/2021 |
| EP | 3823397 | A1 | 5/2021 |
| JP | 2021523647 | A | 9/2021 |
| WO | 2021025693 | A1 | 2/2021 |
| WO | 2021031009 | A1 | 2/2021 |

OTHER PUBLICATIONS

3GPP TSG-RAN WG2 #110-e,R2-2004964, "CG autonomous transmission in inter-UE prioritization" Ericsson et al. Jun. 12, 2020 (Jun. 12, 2020),total 2 pages.

* cited by examiner

*Primary Examiner* — Hong S Cho

(57) ABSTRACT

A data transmission method and an apparatus are provided. In the provided method and apparatus, a terminal can properly discard a part of to-be-transmitted data and notify a base station, to improve resource utilization in a transmission process of XR data.

30 Claims, 6 Drawing Sheets

DATA TRANSMISSION METHOD AND APPARATUS

CROSS-REFERENCE TO RELATED APPLICATIONS

This application is a continuation of International Application No. PCT/CN2022/132971, filed on Nov. 18, 2022, which claims priority to Chinese Patent Application No. 202111523030.7, filed on Dec. 13, 2021. The disclosures of the aforementioned applications are hereby incorporated by reference in their entireties.

TECHNICAL FIELD

This application relates to the field of communication technologies, and in particular, to a data transmission method and an apparatus.

BACKGROUND

In a wireless communication network, an extended reality (XR) technology can provide brand-new visual experience for users by virtue of multi-view, strong interactivity, and other advantages, and therefore has great application value and commercial potentiality. The XR technology covers virtual reality (VR), augmented reality (AR), mixed reality (MR), and other technologies, which are widely applied to many fields such as entertainment, gaming, medical care, advertising, industry, online education, and engineering.

XR data transmission is typically performed in a form of picture frames, and there is typically a dependency relationship between different data packets corresponding to a same picture frame. When an error occurs in transmission of some data packets or the transmission exceeds a delay budget, transmission of the picture frame fails. Therefore, how to improve efficiency of XR data transmission by efficiently using limited radio resources is a problem urgently to be resolved.

SUMMARY

According to a first aspect, an embodiment of this application provides a communication method. The method may be performed by a terminal, or may be performed by a component (for example, a processor, a chip, or a chip system) of the terminal, or may be implemented by a logical module or software that can implement all or some functions of the terminal. The method includes: obtaining configured grant (configured grant, CG) information from a network device, where the CG information is for configuring one or more CG transmission occasions, and the one or more CG transmission occasions are used for uplink data transmission; sending indication information to the network device, where the indication information indicates that uplink data transmission is not performed on N CG transmission occasions of the one or more CG transmission occasions, and N is a positive integer; and skipping the uplink data transmission on the N CG transmission occasions. Optionally, the CG information is carried in a radio resource control (radio resource control, RRC) message. For example, the CG information may be a ConfiguredGrantConfig information element in the RRC message.

In this method, the reason why the uplink data transmission on the N CG transmission occasions is skipped is that the network device cannot successfully restore XR data (for example, a picture frame) corresponding to uplink data even if the uplink data to be transmitted on the N CG transmission occasions is sent and correctly received by the network device. In addition, the network device is notified via the indication information that the uplink data transmission on the N CG transmission occasions is skipped, so that the network device can know resource usage in time. In this way, based on a service and a scheduling requirement, the network device can allocate, to another service or another terminal for use, resources corresponding to these skipped CG transmission occasions, thereby improving overall system resource utilization.

With reference to the first aspect, in some implementations of the first aspect, the indication information includes CG transmission occasion quantity information, and the CG transmission occasion quantity information indicates N. The CG transmission occasion quantity information may be understood as a quantity that is of CG transmission occasions skipped by the terminal and that is indicated to the network device. Based on this information, the network device can accurately know the quantity of the CG transmission occasions skipped by the terminal, and control a quantity of resources more precisely when releasing and re-allocating the resources corresponding to the CG transmission occasions, thereby further improving resource utilization.

Optionally, the CG transmission occasion quantity information may be optional information. When the indication information includes the CG transmission occasion quantity information, the CG transmission occasion quantity information indicates the quantity of skipped CG transmission occasions. When the indication information does not include the CG transmission occasion quantity information, a predefined quantity of CG transmission occasions are skipped by default, and the predefined quantity may be, for example, 1.

With reference to the first aspect, in some implementations of the first aspect, the indication information includes CG index information, and the CG index information indicates the one or more CG transmission occasions. The one or more CG transmission occasions may be indexed by using the CG index information. In a CG mechanism, the network device may configure a plurality of groups of CG transmission occasions with different indexes for the terminal. To enable the network device to know CG transmission occasions that are in a specific group of CG transmission occasions and that are skipped by the terminal, indexes corresponding to the CG transmission occasions to be skipped may be indicated to the network device by using the CG index information, so that the network device can accurately release and allocate resources corresponding to the skipped CG transmission occasions, thereby improving resource utilization.

With reference to the first aspect, in some implementations of the first aspect, the indication information is included in uplink control information (UCI), or the indication information is carried by a media access control (MAC) control element (CE).

When the indication information is included in the UCI, optionally, the UCI may be carried on a physical uplink shared channel (PUSCH), or may be carried on a physical uplink control channel (PUCCH). Optionally, the UCI is configured grant UCI (CG-UCI), and the CG-UCI is used to send CG-related control information to the network device. The CG-UCI may include only the indication information, or may include the indication information and other information. For example, the other information includes one or more of the following information: hybrid automatic repeat request (HARQ) information, redundancy version (RV) information, new data indicator (NDI) information, or channel occupancy time (COT) sharing information. The HARQ information indicates a HARQ process number corresponding to the uplink data transmission, the RV information indicates an RV corresponding to the uplink data transmission, the NDI information indicates whether the uplink data transmission is new data, and the COT sharing information indicates channel occupancy time information in an unlicensed frequency band communication scenario.

The indication information in the UCI may include the CG transmission occasion quantity information and/or the CG index information. When the indication information includes the CG transmission occasion quantity information, for example, a field occupied by the CG transmission occasion quantity information may include three bits, a maximum quantity of eight different skipped CG transmission occasions may be indicated. When the indication information includes the CG index information, for example, a field occupied by the CG index information may include four bits, considering that a maximum of 12 groups of CG transmission occasions with different indexes are configured for a terminal on one bandwidth part (BWP), the CG index information may indicate the maximum of 12 groups of CG transmission occasions with the different indexes. In this case, it may be understood as that the CG index information indicates a CG index at a physical layer.

The UCI includes the indication information, so that the terminal can still send the indication information to the network device in time by using a PUCCH resource even if the terminal has no uplink data to be sent or has no PUSCH resource, and therefore the network device can adjust resource allocation in time.

When the indication information is carried by the MAC CE, optionally, the indication information may include the CG transmission occasion quantity information and/or the CG index information. When the indication information includes the CG transmission occasion quantity information, for example, a field occupied by the CG transmission occasion quantity information may include three bits, a maximum quantity of eight different skipped CG transmission occasions may be indicated. When the indication information includes the CG index information, for example, a field occupied by the CG index information may include five bits, considering that a maximum of 32 groups of CG transmission occasions with different indexes are configured for a terminal on one MAC entity, the CG index information may indicate the maximum of 32 groups of CG transmission occasions with the different indexes. In this case, it may be understood as that the CG index information indicates a CG index at a MAC layer.

The indication information is carried by the MAC CE, so that interaction between the MAC layer and a physical layer can be simplified, thereby shortening a processing delay.

With reference to the first aspect, in some implementations of the first aspect, there are a plurality of different implementations of skipping the uplink data transmission on the N CG transmission occasions.

In a possible implementation, MAC protocol data units (protocol data units, PDUs) on the N CG transmission occasions may not be generated.

In another possible implementation, cached data corresponding to the N CG transmission occasions may be cleared or released.

With reference to the first aspect, in some implementations of the first aspect, uplink data includes picture data, and a value of N is determined based on a quantity of remaining data frames in a group of pictures (GOP), a delay of inserting a data frame, or a remaining transmission delay budget of the data frame.

For example, when I-frames/P-frames are transmitted, a quantity of remaining I-frames and/or P-frames in a GOP may be determined as N.

In this manner of determining N, for another example, when an I-frame/a P-frame is transmitted, if an error occurs in the transmission of the I-frame, the physical layer feeds back the error to an application layer, and the application layer re-inserts the I-frame. This process requires a specific delay. The terminal side may estimate the delay, and determine N based on the delay.

In this manner of determining N, for another example, when base layer data packets and enhancement layer data packets are transmitted, if an error occurs in transmission of a base layer data packet of a data frame, a quantity of CG transmission occasions within a remaining transmission time budget of the data frame may be determined as N.

In this manner of determining N, according to the foregoing implementation, the quantity N of CG transmission occasions that need to be skipped may be determined more accurately based on different source coding configurations or scenarios, so that a data transmission failure caused by excessively large N can be maximally avoided, and a resource waste caused by excessively small N can also be maximally avoided.

With reference to the first aspect, in some implementations of the first aspect, the method further includes: obtaining logical channel configuration information from the network device, where the logical channel configuration information is used to configure a logical channel, and the logical channel configuration information is for configuring the one or more CG transmission occasions that correspond to the configured logical channel and that are allowed to be skipped. The terminal side may determine, based on the logical channel configuration information, to skip the CG transmission occasion corresponding to the logical channel, and send indication information to the network device to indicate that uplink data transmission is not performed on the N CG transmission occasions. Optionally, the logical channel configuration information further includes a maximum quantity Y (where Y is an integer greater than 0) of terminal allowed transmission errors and/or skipped CG transmission occasions, and the terminal side may determine, based on this information, the CG transmission occasion that needs to be skipped. In this implementation, the terminal can know that when the quantity of terminal transmission errors and/or skipped CG transmission occasions is greater than Y, the network device releases/deactivates/disables (disables) resources corresponding to the remaining CG transmission occasions corresponding to the logical channel, so that the terminal can be prompted or encouraged to send the indication information to the network device in time.

The logical channel configuration information may be a LogicalChannelConfig information element in an RRC message, and the information element includes an information element for configuring the logical channel. The LogicalChannelConfig information element may further include a SkipUplinkTxConfigured information element. The SkipUplinkTxConfigured information element is for configuring the CG transmission occasion that corresponds to the logical channel and that the terminal is allowed to skip. In addition, the LogicalChannelConfig information element may further optionally include a maxAllowedSkipSize information element, for configuring the maximum quantity Y of terminal allowed transmission errors and/or skipped CG transmission occasions.

With reference to the first aspect, in some implementations of the first aspect, the CG information is further for configuring the one or more CG transmission occasions allowed to be skipped. The terminal side may determine, based on the CG information, to skip the CG transmission occasion configured by using the CG information, and send the indication information to the network device to indicate that the uplink data transmission is not performed on the N CG transmission occasions. Optionally, the CG information further includes a maximum quantity Z (where Z is an integer greater than 0) of terminal allowed transmission errors and/or skipped CG transmission occasions, and the terminal may determine, based on this information, the CG transmission occasion that needs to be skipped. In this implementation, the terminal can know that when the quantity of terminal transmission errors and/or skipped CG transmission occasions is greater than Z, the network device releases/deactivates/disables (disables) resources corresponding to the remaining CG transmission occasions, so that the terminal can be prompted or encouraged to send the indication information to the network device in time.

The CG information may be a ConfiguredGrantConfig information element in an RRC message, and the information element includes an information element for configuring CG. The ConfiguredGrantConfig information element may further include a SkipUplinkTxConfigured information element. The SkipUplinkTxConfigured information element is for configuring the CG transmission occasion that is configured by using the CG information and that the terminal is allowed to skip. In addition, the ConfiguredGrantConfig information element may further optionally include a maxAllowedSkipSize information element, for configuring the maximum quantity Z of terminal allowed transmission errors and/or skipped CG transmission occasions.

According to a second aspect, an embodiment of this application provides a communication method. The method may be performed by a network device, or may be performed by a component (for example, a processor, a chip, or a chip system) of the network device, or may be implemented by a logical module or software that can implement all or some functions of the network device. The method includes: sending CG information to a terminal, where the CG information is for configuring one or more CG transmission occasions, and the one or more CG transmission occasions are used for uplink data transmission; receiving indication information from the terminal, where the indication information indicates that the terminal does not perform uplink data transmission on N CG transmission occasions of the one or more CG transmission occasions, and N is a positive integer; and skipping uplink data reception from the terminal on the N CG transmission occasions. Optionally, the CG information is carried in an RRC message. For example, the CG information may be a ConfiguredGrantConfig information element in the RRC message.

With reference to the second aspect, in some implementations of the second aspect, the indication information includes CG transmission occasion quantity information, and the CG transmission occasion quantity information indicates N. The CG transmission occasion quantity information may be understood as a quantity that is of CG transmission occasions skipped by the terminal and that is indicated to the network device.

Optionally, the CG transmission occasion quantity information may be optional information. When the indication information includes the CG transmission occasion quantity information, the CG transmission occasion quantity information indicates the quantity of skipped CG transmission occasions. When the indication information does not include the CG transmission occasion quantity information, a predefined quantity of CG transmission occasions are skipped by default, and the predefined quantity may be, for example, 1.

With reference to the second aspect, in some implementations of the second aspect, the indication information includes CG index information, and the CG index information indicates the one or more CG transmission occasions. The one or more CG transmission occasions may be indexed by using the CG index information.

With reference to the second aspect, in some implementations of the second aspect, the indication information is included in UCI, or the indication information is carried by a MAC CE.

When the indication information is included in the UCI, optionally, the UCI may be carried on a PUSCH or a PUCCH. Optionally, the UCI is CG-UCI, and the CG-UCI is used to send CG-related control information to the network device. The CG-UCI may include only the indication information, or may include the indication information and other information. For example, the other information includes one or more of the following information: HARQ information, RV information, NDI information, or COT sharing information. The HARQ information indicates a HARQ process number corresponding to the uplink data transmission, the RV information indicates an RV corresponding to the uplink data transmission, the NDI information indicates whether the uplink data transmission is new data, and the COT sharing information indicates channel occupancy time information in an unlicensed frequency band communication scenario.

The indication information in the UCI may include the CG transmission occasion quantity information and/or the CG index information. When the indication information includes the CG transmission occasion quantity information, for example, a field occupied by the CG transmission occasion quantity information may include three bits, a maximum quantity of eight different skipped CG transmission occasions may be indicated. When the indication information includes the CG index information, for example, a field occupied by the CG index information may include four bits, considering that a maximum of 12 groups of CG transmission occasions with different indexes are configured for a terminal on one BWP, the CG index information may indicate the maximum of 12 groups of CG transmission occasions with the different indexes. In this case, it may be understood as that the CG index information indicates a CG index at a physical layer.

When the indication information is carried by the MAC CE, optionally, the indication information may include the CG transmission occasion quantity information and/or the CG index information. When the indication information includes the CG transmission occasion quantity information, for example, a field occupied by the CG transmission occasion quantity information may include three bits, a maximum quantity of eight different skipped CG transmission occasions may be indicated. When the indication information includes the CG index information, for example, a field occupied by the CG index information may include five bits, considering that a maximum of 32 groups of CG transmission occasions with different indexes are configured for a terminal on one MAC entity, the CG index information may indicate the maximum of 32 groups of CG transmission occasions with the different indexes. In this case, it may be understood as that the CG index information indicates a CG index at a MAC layer.

With reference to the second aspect, in some implementations of the second aspect, the method further includes: allocating, to another terminal other than the terminal for use or another service for use, all or some resources corresponding to the N CG transmission occasions. The network device knows, via the indication information, that the terminal is to skip the uplink data transmission on the N CG transmission occasions, and may release some or all resources corresponding to the N CG transmission occasions, to further allocate these resources to the another terminal other than the terminal for use or the another dynamically scheduled service for use, thereby improving resource utilization.

With reference to the second aspect, in some implementations of the second aspect, the method further includes: sending logical channel configuration information to the terminal, where the logical channel configuration information is used to configure a logical channel, and the logical channel configuration information is for configuring the one or more CG transmission occasions that correspond to the configured logical channel and that are allowed to be skipped.

Optionally, the logical channel configuration information further includes a maximum quantity Y (where Y is an integer greater than 0) of terminal allowed transmission errors and/or skipped CG transmission occasions. The network device may maintain a counter, and update the counter based on a transmission status of the terminal on the CG transmission occasions. When a count value of the counter reaches the maximum quantity Y, the network device releases resources corresponding to the remaining CG transmission occasions, and allocates the resources to another terminal for use, thereby improving resource utilization. Releasing the resources corresponding to the remaining CG transmission occasions may also be understood as deactivating CG configurations corresponding to the remaining CG transmission occasions.

Optionally, the network device may update the counter according to the following mechanism, to improve motivation of the terminal to report the indication information to the network device.

When the terminal fails to transmit data on L (where L is an integer greater than 0) CG transmission occasions (where a possible cause is that the terminal performs the data transmission on these CG transmission occasions but the transmission fails, or the terminal skips the transmission on these CG transmission occasions), but the terminal does not send the indication information, the network device updates the counter by adding L. When the terminal skips the data transmission on the L CG transmission occasions, and sends the indication information to indicate that the data transmission on these CG transmission occasions is skipped, the network device does not update the counter. In this manner of updating the counter, the terminal may be encouraged to report the skipped CG transmission occasions to the network device via the indication information. Because the reporting of the terminal can reduce a possibility that the CG configurations corresponding to the CG transmission occasions is deactivated, the terminal may expect to occupy more CG transmission occasions to perform the data transmission.

The logical channel configuration information may be a LogicalChannelConfig information element in an RRC message, and the information element includes an information element for configuring the logical channel. The LogicalChannelConfig information element may further include a SkipUplinkTxConfigured information element. The SkipUplinkTxConfigured information element is for configuring the CG transmission occasion that corresponds to the logical channel and that the terminal is allowed to skip. In addition, the LogicalChannelConfig information element may further optionally include a maxAllowedSkipSize information element, for configuring the maximum quantity Y of terminal allowed transmission errors and/or skipped CG transmission occasions.

With reference to the second aspect, in some implementations of the second aspect, the CG information is further for configuring the one or more CG transmission occasions allowed to be skipped.

Optionally, the CG information further includes a maximum quantity Z (where Z is an integer greater than 0) of terminal allowed transmission errors and/or skipped CG transmission occasions. The network device may maintain a counter, and update the counter based on a transmission status of the terminal on the CG transmission occasions. When a count value of the counter reaches the maximum quantity Z, the network device releases resources corresponding to the remaining CG transmission occasions, and allocates the resources to another terminal for use, thereby improving resource utilization. For this manner of updating the counter in the optional manner and beneficial effects of the optional manner, refer to the descriptions in the foregoing implementations. Details are not described herein again.

The CG information may be a ConfiguredGrantConfig information element in an RRC message, and the information element includes an information element for configuring CG. The ConfiguredGrantConfig information element may further include a SkipUplinkTxConfigured information element. The SkipUplinkTxConfigured information element is for configuring the CG transmission occasion that is configured by using the CG information and that the terminal is allowed to skip. In addition, the ConfiguredGrantConfig information element may further optionally include a maxAllowedSkipSize information element, for configuring the maximum quantity Z of terminal allowed transmission errors and/or skipped CG transmission occasions.

According to a third aspect, an embodiment of this application provides an apparatus. The apparatus may implement the method according to any one of the first aspect or the possible implementations of the first aspect. The apparatus includes a corresponding unit or module configured to perform the method. The unit or module included in the apparatus can be implemented by using software and/or hardware. For example, the apparatus may be a terminal, or may be a chip, a chip system, a processor, or the like that supports the terminal in implementing the method, or may be a logical module or software that can implement all or some functions of the terminal.

According to a fourth aspect, an embodiment of this application provides an apparatus. The apparatus may implement the method according to any one of the second aspect or the possible implementations of the second aspect. The apparatus includes a corresponding unit or module configured to perform the method. The unit or module included in the apparatus can be implemented by using software and/or hardware. For example, the apparatus may be a network device, or may be a chip, a chip system, a processor, or the like that supports the network device in implementing the method, or may be a logical module or software that can implement all or some functions of the network device.

According to a fifth aspect, an embodiment of this application provides an apparatus, including a processor. The processor is coupled to a memory, the memory is configured to store instructions, and when the instructions are executed by the processor, the apparatus is enabled to implement the method according to any one of the first aspect or the possible implementations of the first aspect.

According to a sixth aspect, an embodiment of this application provides an apparatus, including a processor. The processor is coupled to a memory, the memory is configured to store instructions, and when the instructions are executed by the processor, the apparatus is enabled to implement the method according to any one of the second aspect or the possible implementations of the second aspect.

According to a seventh aspect, an embodiment of this application provides a computer-readable storage medium. The computer-readable storage medium stores instructions, and when the instructions are executed, a computer is enabled to perform the method according to any one of the first aspect or the possible implementations of the first aspect.

According to an eighth aspect, an embodiment of this application provides a computer-readable storage medium. The computer-readable storage medium stores instructions, and when the instructions are executed, a computer is enabled to perform the method according to any one of the second aspect or the possible implementations of the second aspect.

According to a ninth aspect, an embodiment of this application provides a computer program product. The computer program product includes computer program code, and when the computer program code is run on a computer, the computer is enabled to perform the method according to any one of the first aspect or the possible implementations of the first aspect.

According to a tenth aspect, an embodiment of this application provides a computer program product. The computer program product includes computer program code, and when the computer program code is run on a computer, the computer is enabled to perform the method according to any one of the second aspect or the possible implementations of the second aspect.

According to an eleventh aspect, an embodiment of this application provides a chip, including a processor. The processor is coupled to a memory, the memory is configured to store instructions, and when the instructions are executed by the processor, the chip is enabled to implement the method according to any one of the first aspect, the second aspect, the possible implementations of the first aspect, or the possible implementations of the second aspect.

According to a twelfth aspect, an embodiment of this application provides a communication system, including the apparatus according to the third aspect and the apparatus according to the fourth aspect.

According to a thirteenth aspect, an embodiment of this application provides a communication system, including the apparatus according to the fifth aspect and the apparatus according to the sixth aspect.

It may be understood that, for beneficial effects of features in the second aspect to the eighth aspect corresponding to these in the first aspect, refer to related descriptions in the first aspect. Details are not described again.

BRIEF DESCRIPTION OF DRAWINGS

FIG. 1 is a diagram of a communication system to which an embodiment according to this application is applied;

FIG. 2 to FIG. 5 are diagrams of several system frameworks to which embodiments of this application are applicable;

FIG. 6 is a diagram of periodic data;

FIG. 7 is a diagram of impact of transmission of an internet protocol (Internet protocol, IP) packet on a picture frame;

DESCRIPTION OF EMBODIMENTS

Figures 1, 2, 3, 4:
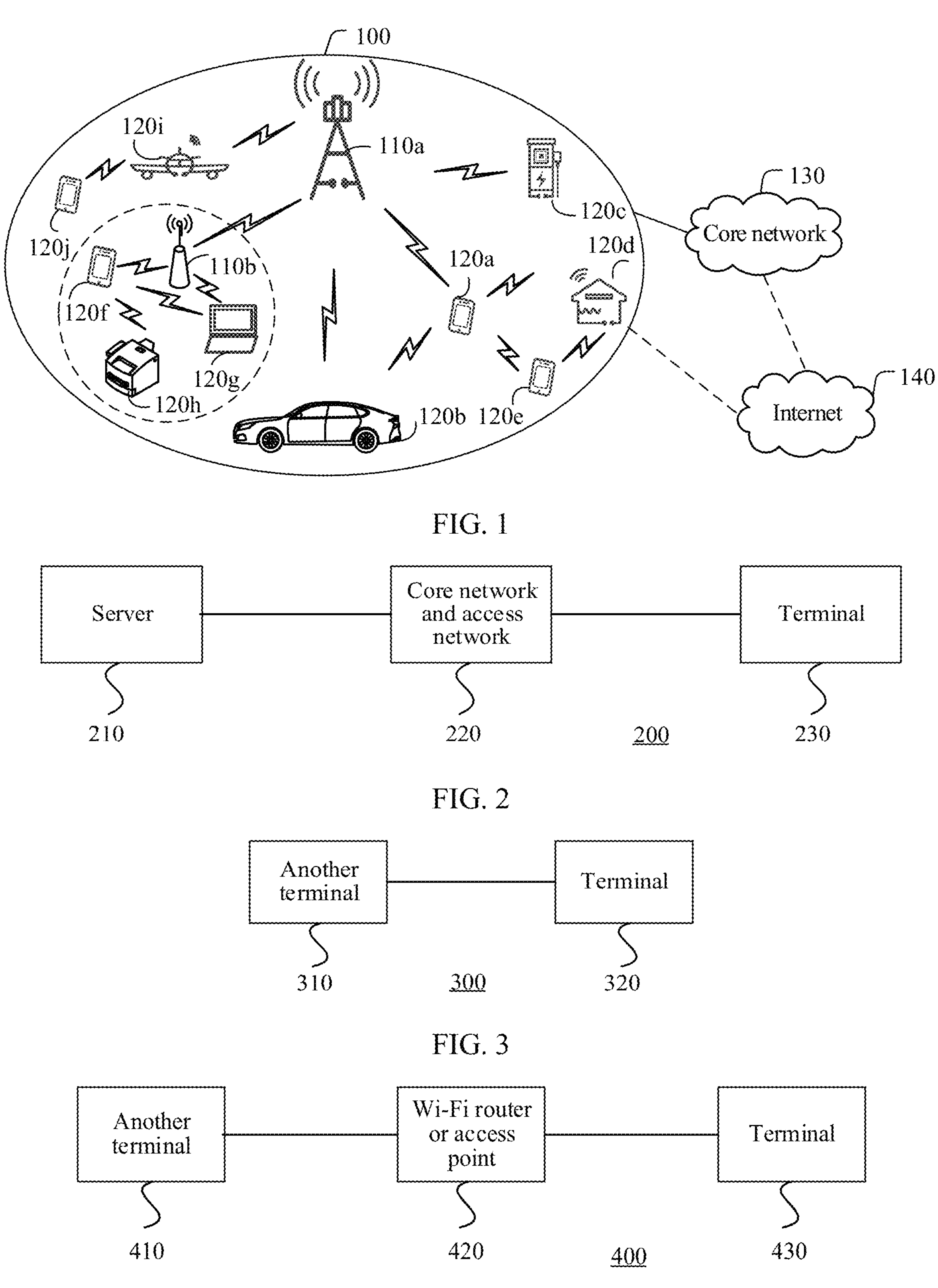

FIG. 1 is a diagram of an embodiment of an architecture of a communication system. As shown in FIG. 1, the communication system includes a radio access network 100 and a core network 130. Optionally, the communication system may further include an internet 140. The radio access network 100 may include at least one radio access network device (for example, 110*a* and 110*b* in FIG. 1), and may further include at least one terminal (for example, 120*a* to 120*j* in FIG. 1). The terminal is connected to the radio access network device in a wireless manner, and the radio access network device is connected to the core network in a wireless or wired manner. A core network device and the radio access network device may be independent and different devices, or functions of the core network device and logical functions of the radio access network device are integrated into a same device, or some functions of the core network device and some functions of the radio access network device are integrated into one device. The wired or wireless manner may be used for connection between terminals and between radio access network devices. FIG. 1 is merely a diagram. The communication system may further include other network devices, for example, may further include a relay device and a backhaul device, which are not shown in FIG. 1.

A method and an apparatus that are provided in embodiments of this application may be used in various communication systems, for example, a 4th generation (4th generation, 4G) communication system, a 4.5G communication system, a 5G communication system, a 5.5G communication system, a 6G communication system, a system integrating a plurality of communication systems, or a future evolved communication system. The various communication systems are, for example, a long term evolution (long term evolution, LTE) system, a new radio (new radio, NR) system, a wireless fidelity (wireless-fidelity, Wi-Fi) system, a communication system related to a 3rd generation partnership project (3rd generation partnership project, 3GPP), and another communication system of this type.

The radio access network device (which is also referred to as a network device sometimes in this application) may be a base station (base station), an evolved NodeB (evolved NodeB, eNodeB), a transmission reception point (transmission reception point, TRP), a next generation NodeB (next generation NodeB, gNB) in a 5G mobile communication system, a next generation base station in a 6G mobile communication system, a base station in a future mobile communication system, an access node in the Wi-Fi system, or the like; or may be a module or a unit that completes some functions of a base station, for example, may be a central unit (central unit, CU) or a distributed unit (distributed unit, DU). The radio access network device may be a macro base station (for example, 110*a* in FIG. 1), or may be a micro base station or an indoor base station (for example, 110*b* in FIG. 1), or may be a relay node, a donor node, or the like. It may be understood that all or some functions of the radio access network device in this application may alternatively be implemented by using a software function running on hardware, or may be implemented by using an instantiated virtualization function on a platform (for example, a cloud platform). A specific technology and a specific device form that are used by the radio access network device are not limited in embodiments of this application. For ease of description, the following provides descriptions by using an example in which the base station is used as the radio access network device.

The terminal may also be referred to as a terminal device, user equipment (user equipment, UE), a mobile station, a mobile terminal, or the like. The terminal may be widely applied to various scenarios, for example, device-to-device (device-to-device, D2D), vehicle-to-everything (vehicle-to-everything, V2X) communication, machine-type communication (machine-type communication, MTC), internet of things (internet of things, IoT), virtual reality, augmented reality, industrial control, self-driving, telemedicine, a smart grid, smart furniture, a smart office, smart wearable, smart transportation, and a smart city. The terminal may be a mobile phone, a tablet computer, a computer with a wireless transceiver function, a wearable device, a vehicle, an uncrewed aerial vehicle, a helicopter, an airplane, a ship, a robot, a robot arm, a smart home device, or the like. A specific technology and a specific device form that are used by the terminal are not limited in embodiments of this application.

Alternatively, the terminal in this application may be a VR terminal, an AR terminal, or an MR terminal. The VR terminal, the AR terminal, and the MR terminal all may be referred to as XR terminals. The XR terminal may be, for example, a head-mounted device (for example, a helmet or glasses), may be an all-in-one machine, or may be a television, a display, a car, a vehicle-mounted device, a tablet, or a smart screen. The XR terminal can present XR data to a user, and the user can experience diversified XR services by wearing or using the XR terminal. The XR terminal may access a network in the wireless or wired manner, for example, access the network via the Wi-Fi system, the 5G system, or another system.

The base station and the terminal may be fixed or movable. The base station and the terminal may be deployed on the land, including an indoor or outdoor scenario, and a handheld or vehicle-mounted scenario; or may be deployed on a water surface; or may be deployed on an airplane, a balloon, or an artificial satellite in the air. Application scenarios of the base station and the terminal are not limited in embodiments of this application.

Roles of the base station and the terminal may be relative. For example, the airplane or uncrewed aerial vehicle 120*i* in FIG. 1 may be configured as a mobile base station. For the terminal 120*j* that accesses the radio access network 100 through 120*i*, the terminal 120*i* is a base station. However, for the base station 110*a*, 120*i* is a terminal, that is, 110*a* and 120*i* communicate with each other according to a radio air interface protocol. Certainly, 110*a* and 120*i* may alternatively communicate with each other according to an interface protocol between base stations. In this case, for 110*a*, 120*i* is also a base station. Therefore, both the base station and the terminal may be collectively referred to as communication apparatuses. 110*a* and 110*b* in FIG. 1 may be referred to as communication apparatuses having functions of the base station, and 120*a* to 120*j* in FIG. 1 may be referred to as communication apparatuses having functions of the terminal.

Communication between the base station and the terminal, between the base stations, and between the terminals may be performed over a licensed spectrum, an unlicensed spectrum, or both the licensed spectrum and the unlicensed spectrum. Communication may be performed over a spectrum below 6 gigahertz (gigahertz, GHz), or a spectrum above 6 GHz, or both the spectrum below 6 GHz and the spectrum above 6 GHz. A spectrum resource used for wireless communication is not limited in embodiments of this application.

In embodiments of this application, the functions of the base station may be performed by a module (for example, a chip) in the base station, or may be performed by a control subsystem including the functions of the base station. The control subsystem including the functions of the base station herein may be a control center in an application scenario of the foregoing terminal, such as a smart grid, industrial control, smart transportation, and a smart city. The functions of the terminal may be performed by a module (for example, a chip or a modem) in the terminal, or may be performed by an apparatus including the functions of the terminal.

In this application, the base station sends a downlink signal or downlink information to the terminal, where the downlink information is carried on a downlink channel; the terminal sends an uplink signal or uplink information to the base station, where the uplink information is carried on an uplink channel; and the terminal sends a sidelink (sidelink) signal or sidelink information to the terminal, where the sidelink information is carried on a sidelink channel.

An XR technology can provide brand-new experience for users by virtue of multi-view, strong interactivity, and other advantages, and therefore has great application value and business potentiality. The XR technology covers VR, AR, MR, and other technologies, which are widely used in many fields such as entertainment, gaming, medical care, advertising, industry, online education, and engineering. The VR technology is mainly to render visual and audio scenarios to maximally simulate sensory stimulation of vision and audio in the real world to users. The VR technology usually requires users to wear the XR terminal (for example, the head-mounted device) to simulate vision and/or hearing of the users. The VR technology may further perform action tracking on users, to update simulated visual and/or auditory content in time. The AR technology is mainly to provide additional visual and/or auditory information or manually generated content in a real environment perceived users. The users may directly (where, for example, sensing, processing, and rendering are not performed) or indirectly (where, for example, transferring is performed using a sensor or the like) perceive the real environment, and further enhancement processing is performed. The MR technology is to insert some virtual elements into a physical scenario, to provide immersive experience for the users by adding these elements as a part of a real scenario.

Embodiments provided in this application are applicable to a plurality of different scenarios. FIG. 2 to FIG. 5 are diagrams of several system frameworks to which embodiments of this application are applicable.

FIG. 2 is a diagram of a scenario to which an embodiment of this application is applicable. FIG. 2 shows a system 200, including a server 210, a core network and access network 220 (which may be briefly referred to as a transport network 220, for example, an LTE network, a 5G network, or a 6G network), and a terminal 230. The server 210 may be configured to: encode, decode, and render XR source data, the transport network 220 may be used to transmit XR data, and the terminal 230 provides diversified XR experience for users by processing the XR data. It may be understood that there may be further another apparatus between the transport network 220 and the terminal 230. For example, another terminal (for example, a mobile phone, a notebook computer, or a vehicle-mounted terminal) and/or a network device (for example, a relay device, an integrated access and backhaul (integrated access and backhaul, IAB) device, a Wi-Fi router, or a Wi-Fi access point) may be further included. The terminal 230 obtains the XR data from the transport network 220 via the another terminal and/or the network device.

FIG. 3 is another diagram of a scenario to which an embodiment of this application is applicable. FIG. 3 shows a system 300, including a terminal 320 and another terminal 310. The another terminal 310 is a terminal other than the terminal 320. The another terminal 310 may transmit XR data to the terminal 320. For example, the another terminal 310 may project the XR data to the terminal 320. For another example, the another terminal 310 and the terminal 320 are vehicle-mounted terminals, and the XR data may be interacted between the vehicle-mounted terminals. It may be understood that the another terminal 310 may be further connected to a transport network (for example, an LTE network, a 5G network, or a 6G network), to obtain XR data from the transport network, or send data to the transport network.

FIG. 4 is another diagram of a scenario to which an embodiment of this application is applicable. FIG. 4 shows a system 400, including a terminal 430, a Wi-Fi router or a Wi-Fi access point 420 (which may be briefly referred to as a Wi-Fi apparatus 420), and another terminal 410. The another terminal 410 is a terminal other than the terminal 430. The another terminal 410 may transmit XR data to the terminal 430 via the Wi-Fi apparatus 420. For example, the another terminal 410 is a mobile phone device, the Wi-Fi apparatus 420 is the Wi-Fi router, the Wi-Fi access point, or a set-top box, and the terminal 430 is a television device, a smart screen device, or an electronic tablet device. The mobile phone device may project the XR data to the television device, the smart screen device, or the electronic tablet device via the Wi-Fi router, the Wi-Fi access point, or the set-top box, to present the XR data to a user.

FIG. 5 is another diagram of a scenario to which an embodiment of this application is applicable. FIG. 5 shows a system 500, including a server 510, a fixed network 520, a Wi-Fi router or a Wi-Fi access point 530 (which may be briefly referred to as a Wi-Fi apparatus 530), and a terminal 540. The server 510 may be configured to: encode, decode, and render XR source data, and transmit XR data to the terminal 540 via the fixed network 520 and the Wi-Fi apparatus 530. For example, the fixed network 520 is an operator network, and the Wi-Fi apparatus 530 is the Wi-Fi router, the Wi-Fi access point, or a set-top box. The server 510 transmits or projects the XR data to the terminal 540 via the operator network 520 and the Wi-Fi apparatus 530.

It may be understood that FIG. 2 to FIG. 5 are merely examples of the several scenarios to which embodiments of this application are applicable, and do not limit an applicable scenario of embodiments of this application.

The following describes technical solutions of this application with reference to the accompanying drawings.

In addition, for ease of understanding the technical solutions of this application, features of an XR service or a video service and a CG mechanism are first briefly described.

XR data or video service data usually has a specific frame rate and a specific periodicity. For example, FIG. 6 is a diagram of distribution of picture frames of an XR service in time in a case of a frame rate being 60 frames per second (frames per second, FPS). It can be learned from FIG. 6 that, in the case of 60 FPS, a picture frame appears or arrives at an interval of 1000/60≈16.67 ms.

Other possible frame rates further include 30 FPS, 90 FPS, and 120 FPS. A radio access network device may obtain a frame rate of XR data or video service data in a plurality of different manners.

For example, the radio access network device may obtain the frame rate of the XR data or the video service data based on configuration information of a quality of service (quality of service, QoS) flow corresponding to the data, for example, a QoS profile (QoS profile). For another example, the radio access network device may obtain the frame rate of the XR data or the video service data by detecting an arrival time interval of a data packet in a QoS flow. For another example, a terminal may report, to the radio access network device via assistance information, for example, an information element UEAssistanceInformation, a frame rate of uplink data or information related to the frame rate.

The terminal may also obtain the frame rate of the XR data or the video service data in a plurality of different manners.

For example, the terminal may obtain the frame rate of the XR data or the video service data based on configuration information of a QoS flow corresponding to the data, for example, a QoS rule (QoS rule). For another example, the terminal may obtain the frame rate of the XR data or the video service data by detecting an arrival time interval of a data packet in a QoS flow. For another example, the terminal may notify, through interaction between protocol layers, a protocol layer (for example, an RRC layer) below an application layer of the terminal of a frame rate of application layer data or information related to the frame rate.

The configured grant (configured grant, CG) mechanism is a data transmission mechanism suitable for performing uplink periodic service transmission. According to the CG mechanism, in a transmission process of uplink data, a resource (which may also be referred to as a CG resource) used for uplink data transmission may be allocated to the terminal by using an RRC message or downlink control information (downlink control information, DCI), so that the terminal can periodically and repeatedly use the allocated resource to perform the uplink data transmission. The CG resource may also be referred to as a CG transmission occasion in time domain. The CG mechanism may also be sometimes referred to as a configured scheduling (configured scheduling, CS) mechanism or a grant free (grant free, GF) mechanism.

The CG mechanism includes two types: a CG type 1 and a CG type 2. The following separately describes working procedures of the two CG types.

CG Type 1:

In the CG type 1, the radio access network device provides, for the terminal via the RRC message, CG-related configurations, for example, a CG periodicity and the CG resource. The RRC message is further used to activate the CG configurations. After receiving the RRC message, the terminal may send the uplink data to the radio access network device based on the CG periodicity and the CG resource that are configured by using the RRC message.

In the CG type 1, the radio access network device sends the DCI to the terminal, to indicate the terminal to deactivate the CG configurations. After receiving the DCI, the terminal may release the CG resource, or it may be understood as stopping/suspending uplink data sending on the CG resource.

CG Type 2:

In the CG type 2, the radio access network device provides, for the terminal via the RRC message, CG-related configurations, for example, a CG periodicity. The radio access network device further indicates the CG resource to the terminal by using the DCI. After receiving the DCI, the terminal may send the uplink data to the radio access network device based on the CG periodicity configured by using the RRC message and the CG resource indicated by the DCI. The DCI may also be understood as indicating and activating the CG resource.

In the CG type 2, the radio access network device sends another piece of DCI to the terminal, to indicate the terminal to deactivate the CG configurations. After receiving the DCI, the terminal may release the CG resource, or it may be understood as stopping/suspending uplink data sending on the CG resource.

In the CG mechanism (including the CG type 1 and the CG type 2), one CG resource is usually configured in one CG periodicity to transmit one transport block (transport block, TB). For a service having a high reliability requirement, for example, an ultra-reliable low-latency communication (ultra-reliable low-latency communication, URLLC) service, a plurality of CG resources may be configured in one CG periodicity, to transmit different redundancy versions (redundancy versions, RVs) of one TB, thereby improving data transmission reliability. The RV is designed to implement incremental redundancy (incremental redundancy, IR) hybrid automatic repeat request (hybrid automatic repeat request, HARQ) transmission. For example, bits generated through encoding are divided into several bit groups, each RV corresponds to one bit group, and bit groups corresponding to different RVs are used for initial transmission and retransmission, to gradually accumulate redundant bits, complete an IR HARQ operation, and improve data transmission reliability.

Transmission of different RVs of one TB may also be referred to as repeated transmission of the TB, or referred to as CG repeated transmission or physical uplink shared channel (physical uplink shared channel, PUSCH) repeated transmission. The radio access network device may configure a quantity of repeated transmission times in the CG periodicity for the terminal based on information about a quantity of repeated transmission times in the RRC message.

There are two types of PUSCH repeated transmission in the CG mechanism: a PUSCH repetition type A and a PUSCH repetition type B. The following separately describes the two PUSCH repetition types.

PUSCH Repetition Type A:

The PUSCH repetition type A may be understood as repeated transmission at a slot (slot) level, to be specific, different RVs of one TB are transmitted in a plurality of consecutive or inconsecutive slots, and CG resource configurations in all the slots are the same.

PUSCH Repetition Type B:

The PUSCH repetition type B may be understood as repeated transmission at a mini-slot (mini-slot) level, to be specific, different RVs of one TB are transmitted in a plurality of consecutive or inconsecutive mini-slots, and CG resource configurations in all the mini-slots are the same. For example, when one slot includes 14 symbols, one mini-slot includes two symbols or seven symbols. In addition, repeated transmission at the mini-slot level may be performed in one slot, or may be performed across a plurality of slots.

As described above, the XR data or the video service data usually has a specific frame rate and a specific periodicity. Therefore, the CG mechanism is also suitable for transmitting the XR data or the video service data that has the periodicity.

The XR data is usually transmitted in a form of a picture frame, and a same picture frame may be usually processed into a plurality of data packets. For example, the same picture frame may be divided into a plurality of internet protocol (Internet protocol, IP) packets, which are transmitted by the terminal to a base station side of a radio access network (radio access network, RAN), and then transmitted, through a core network, to a server for rendering. Because data compression is usually performed on the picture frame through source coding, there is usually a specific dependency relationship between a plurality of IP packets of a picture frame. As shown in FIG. 7, in a transmission process, if an error occurs in transmission of an IP packet, an entire picture frame cannot be restored. The picture frame can be correctly restored at a receive end only when all IP packets corresponding to the picture frame are successfully transmitted.

Figure 8:
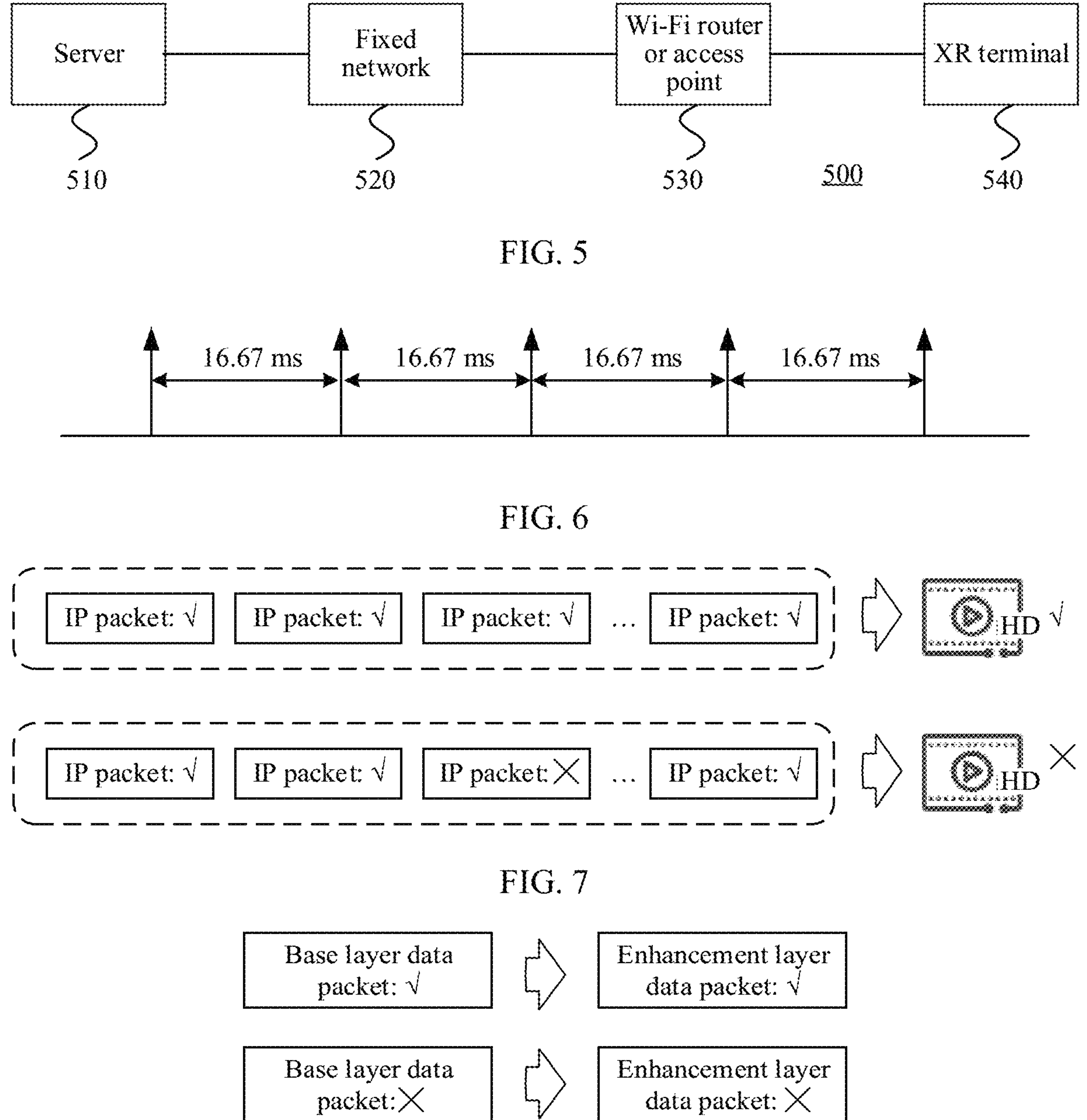
FIG. 8 is a diagram of impact of transmission of a base layer data packet on an enhancement layer data packet.

In layered encoding, XR data may be divided into a base layer data packet and an enhancement layer data packet for transmission. The base layer data packet may enable a decoder at the receive end to obtain basic video content through decoding. The enhancement layer data packet includes more detailed information of a video, to improve video quality. In a network transmission process, the base layer data packet and the enhancement layer data packet are usually transmitted separately, and provide different QoS guarantees. There is usually a specific association relationship between the base layer data packet and the enhancement layer data packet. The base layer data packet may be decoded independently to ensure basic user experience, while the enhancement layer data packet can be correctly decoded only by relying on the base layer data packet. As shown in FIG. 8, if the base layer data packet fails to be transmitted, the enhancement layer data packet cannot be correctly decoded. The enhancement layer data packet can be correctly decoded at the receive end only when the base layer data packet is successfully transmitted.

Figure 9:
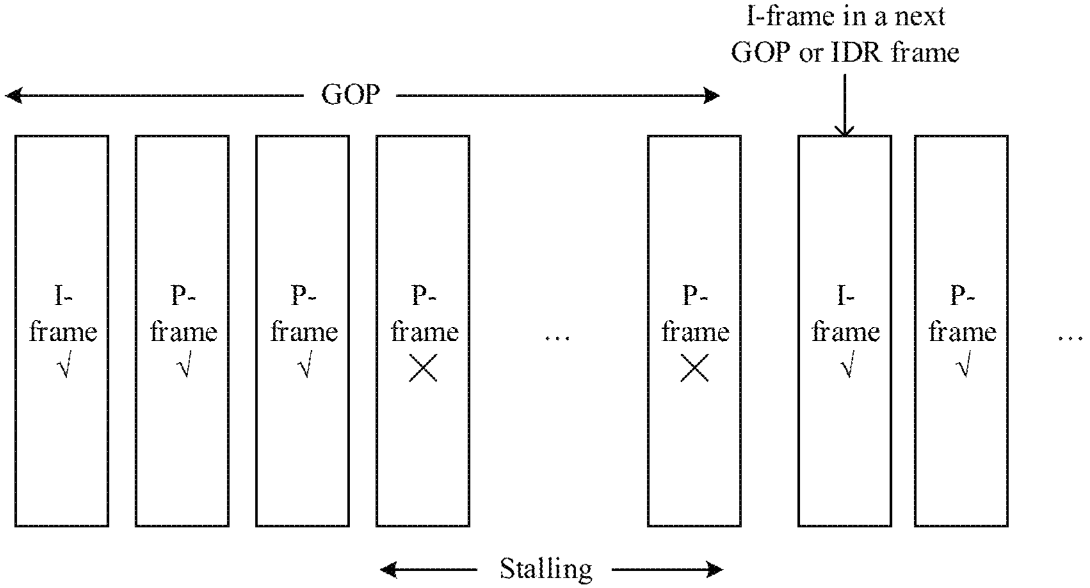
FIG. 9 is a diagram of impact of transmission of a P-frame on another P-frame.

In inter-frame reference coding, XR data may be divided into an I-frame and a P-frame for transmission. The I-frame and the P-frame may be included in a group of pictures (group of pictures, GOP). As shown in FIG. 9, the 1$^{st}$ frame in a GOP is usually an I-frame, and the I-frame may be encoded and decoded independently without reference to another frame. The another frame in the GOP is usually a P-frame, and a previous frame needs to be referenced during encoding and decoding of the P-frame. If content in the previous frame fails to be transmitted, the subsequent P-frame cannot be correctly decoded, resulting in stalling (stalling). The stalling can be eliminated only when an I-frame in a next GOP is correctly received or an instantaneous decoding refresh (instantaneous decoder refresh, IDR) frame is inserted.

It can be learned that in a transmission process of XR data, when an error occurs in transmission of a part of the data or the transmission exceeds a delay budget, the XR data fails to be transmitted. In this case, if other data that is in an association relationship or a dependency relationship with the data continues to be transmitted, the XR data cannot be successfully received, resulting in a waste of transmission resources. Therefore, how to efficiently use limited radio resources to improve efficiency of transmitting the XR data is a problem that urgently needs to be resolved.

This application provides a data transmission method, so that a terminal can properly discard a part of to-be-transmitted data and notify a base station, to improve resource utilization in a transmission process of XR data. It may be understood that the method provided in this application does not limit a data service type to which the method is applied, and a data service type other than the XR data and/or video service data is also applicable.

Figure 10:
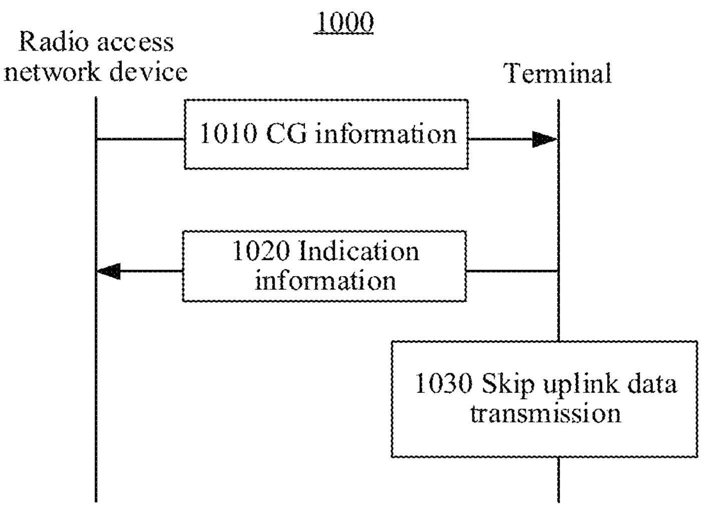
FIG. 10 is a diagram of a data transmission method according to an embodiment of this application.

FIG. 10 is an interaction diagram of a data transmission method 1000 according to an embodiment of this application. In FIG. 10, the method is described by using an example in which a radio access network device and a terminal are used as execution bodies of the interaction example. However, the execution bodies of the interaction example are not limited in this application. For example, the radio access network device in FIG. 10 may alternatively be a chip, a chip system, or a processor that supports the radio access network device in implementing the method, or may be a logical module or software that can implement all or some functions of the radio access network device. The terminal in FIG. 10 may alternatively be a chip, a chip system, or a processor that supports the terminal in implementing the method, or may be a logical module or software that can implement all or some functions of the terminal. As shown in FIG. 10, the method 1000 in this embodiment may include part 1010, part 1020, and part 1030.

Part 1010: The radio access network device sends CG information to the terminal, and correspondingly, the terminal obtains the CG information. The CG information is used to configure one or more CG transmission occasions used for uplink data transmission. It may be understood that these CG transmission occasions may be identified by using an index.

Optionally, the CG information is carried in an RRC message. For example, the CG information may be a ConfiguredGrantConfig information element in the RRC message. It may be understood that ConfiguredGrantConfig is merely a possible name of the CG information, and the name of the CG information is not limited in this application.

Figures 11, 12, 13:
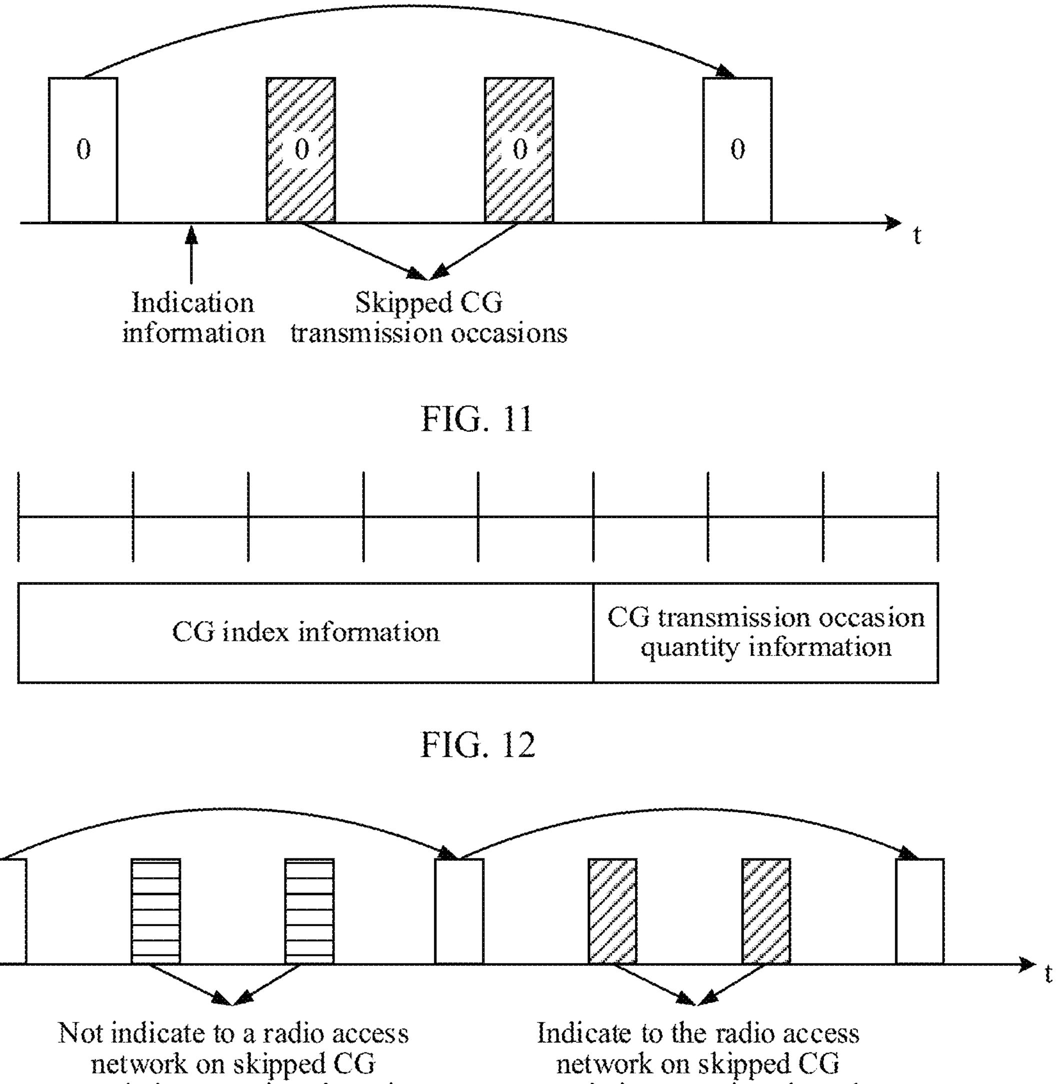
FIG. 11 is a diagram of skipping a configured grant (configured grant, CG) transmission occasion.
FIG. 12 shows a media access control (media access control, MAC) control element (control element, CE) carrying CG transmission occasion quantity information and CG index information.
FIG. 13 is another diagram of skipping a CG transmission occasion.

For example, as shown in FIG. 11, the radio access network device may configure, for the terminal by using the CG information, four CG transmission occasions shown in the figure. For example, the four CG transmission occasions may be identified by using an index 0. A time interval among the four CG transmission occasions may be an arrival periodicity of a picture frame of XR data, for example, an arrival periodicity of 16.67 ms in a case of 60 FPS.

Part 1020: The terminal sends indication information to the radio access network device, and correspondingly, the radio access network device receives the indication information. The indication information indicates, to the radio access network device, that the terminal does not perform uplink data transmission on N CG transmission occasions of the one or more CG transmission occasions, and N is a positive integer. That the uplink data transmission is not performed on the N CG transmission occasions may also be understood as skipping the uplink data transmission on the N CG transmission occasions.

Part 1030: The terminal skips the uplink data transmission on the N CG transmission occasions. Correspondingly, the radio access network device skips uplink data reception from the terminal on the N CG transmission occasions.

The reason why the terminal skips the uplink data transmission on the N CG transmission occasions is that even if the uplink data to be transmitted on the N CG transmission occasions is sent and correctly received by the radio access network device, the radio access network device cannot successfully restore XR data (for example, a picture frame) corresponding to the uplink data. For example, when the uplink data that corresponds to a picture frame and that is transmitted on a CG transmission occasion before the N CG transmission occasions fails to be transmitted, regardless of whether the uplink data that corresponds to the picture frame and that is on the N CG transmission occasions is successfully transmitted, the radio access network device cannot restore the picture frame.

In addition, the terminal notifies, via the indication information, the radio access network device that the uplink data transmission on the N CG transmission occasions is skipped, so that the radio access network device can know resource usage in time. Consequently, based on a service and a scheduling requirement, the radio access network device can allocate, to another service or another terminal for use, resources corresponding to these skipped CG transmission occasions, thereby improving overall system resource utilization.

For example, in the four CG transmission occasions shown in FIG. 11, data of a picture frame sent by the terminal on the $1^{st}$ CG transmission occasion is unsuccessfully transmitted. The terminal may send the indication information to the radio access network device between the $1^{st}$ CG transmission occasion and the $2^{nd}$ CG transmission occasion, to indicate to the radio access network device that the terminal does not transmit remaining data of the picture frame on the next two CG transmission occasions. Then, the terminal skips the uplink data transmission on the $2^{nd}$ and $3^{rd}$ CG transmission occasions in the four CG transmission occasions, while the radio access network device skips uplink data reception from the terminal on the $2^{nd}$ and $3^{rd}$ CG transmission occasions.

In part 1020, optionally, the indication information includes CG transmission occasion quantity information indicating N. The CG transmission occasion quantity information may be understood as a quantity that is of CG transmission occasions skipped by the terminal and that is indicated to the radio access network device. Based on this information, the radio access network device can accurately know the quantity of the CG transmission occasions skipped by the terminal, and can control a quantity of resources more precisely when releasing and re-allocating the resources, thereby further improving resource utilization.

For example, in the four CG transmission occasions shown in FIG. 11, data of a picture frame sent by the terminal on the $1^{st}$ CG transmission occasion is unsuccessfully transmitted. The terminal may send, to the radio access network device between the 1st CG transmission occasion and the 2nd CG transmission occasion, the indication information including the CG transmission occasion quantity information. The CG transmission occasion quantity information indicates that the quantity N of the skipped CG transmission occasions is 2. The radio access network device obtains the CG transmission occasion quantity information, and may know that the terminal is to skip the next two CG transmission occasions (the 2nd and 3rd CG transmission occasions).

The CG transmission occasion quantity information may be optional information. When the indication information includes the CG transmission occasion quantity information, the CG transmission occasion quantity information indicates the quantity of skipped CG transmission occasions. When the indication information does not include the CG transmission occasion quantity information, a predefined quantity of CG transmission occasions are skipped by default, and the predefined quantity may be, for example, 1.

In part 1020, optionally, the indication information includes CG index information indicating the one or more CG transmission occasions. The one or more CG transmission occasions may be indexed by using the CG index information. In a CG mechanism, the radio access network device may configure a plurality of groups of CG transmission occasions with different indexes for the terminal. To enable the radio access network device to know CG transmission occasions that are in a group of CG transmission occasions and that are skipped by the terminal, the terminal may indicate, to the radio access network device by using the CG index information, indexes corresponding to the CG transmission occasions to be skipped, so that the radio access network device can accurately release and allocate resources corresponding to the skipped CG transmission occasions, thereby improving resource utilization.

For example, in FIG. 11, the four CG transmission occasions are indexed by using the index 0. If data of a picture frame sent by the terminal on the 1st CG transmission occasion is unsuccessfully transmitted, the terminal may send, to the radio access network device, the indication information including the CG index information, where the CG index information indicates the index 0, so that the radio access network device can know that the CG transmission occasions to be skipped by the terminal are included in the CG transmission occasions indexed by using the index 0.

In a possible implementation of part 1020, the indication information is included in uplink control information (uplink control information, UCI). Optionally, the UCI may be carried on a physical uplink shared channel (physical uplink shared channel, PUSCH), or may be carried on a physical uplink control channel (physical uplink control channel, PUCCH). Optionally, the UCI is configured grant UCI (CG-UCI), and the CG-UCI is used by the terminal to send CG-related control information to the radio access network device. The CG-UCI may include only the indication information, or may include the indication information and other information. For example, the other information includes one or more of the following information: HARQ information, RV information, new data indicator (new data indicator, NDI) information, or channel occupancy time (channel occupancy time, COT) sharing information. The HARQ information indicates a HARQ process number corresponding to the uplink data transmission, the RV information indicates an RV corresponding to the uplink data transmission, the NDI information indicates whether the uplink data transmission is new data, and the COT sharing information indicates channel occupancy time information in an unlicensed frequency band communication scenario.

The indication information in the UCI may include the CG transmission occasion quantity information and/or the CG index information. When the indication information includes the CG transmission occasion quantity information, and a field occupied by the CG transmission occasion quantity information may include three bits, a maximum quantity of eight different skipped CG transmission occasions may be indicated. When the indication information includes the CG index information, and a field occupied by the CG index information may include four bits, considering that a maximum of 12 groups of CG transmission occasions with different indexes are configured for a terminal on one bandwidth part, the CG index information may indicate the maximum of 12 groups of CG transmission occasions with the different indexes. In this case, it may be understood as that the CG index information indicates a CG index at a physical layer.

The UCI includes the indication information, so that even when the terminal has no uplink data to be sent or has no PUSCH resource, the terminal can send the indication information to a network device in time by using a PUCCH resource, so that the network device can adjust resource allocation in time, to improve radio resource utilization.

In another possible implementation of part 1020, when the indication information is carried by a MAC CE, the indication information may include the CG transmission occasion quantity information and/or the CG index information. When the indication information includes the CG transmission occasion quantity information, and a field occupied by the CG transmission occasion quantity information may include three bits, a maximum quantity of eight different skipped CG transmission occasions may be indicated. When the indication information includes the CG index information, and a field occupied by the CG index information may include five bits, considering that a maximum of 32 groups of CG transmission occasions with different indexes are configured for a terminal on one MAC entity, the CG index information may indicate the maximum of 32 groups of CG transmission occasions with the different indexes. In this case, it may be understood as that the CG index information indicates a CG index at a MAC layer. FIG. 12 is used as an example. FIG. 12 shows a MAC CE carrying CG transmission occasion quantity information and CG index information, where the CG transmission occasion quantity information occupies three low-order bits, and the CG index information occupies five high-order bits. It may be understood that specific locations and a sequence of bits occupied by the indication information in the MAC CE are not limited in this application. For example, the CG transmission occasion quantity information may alternatively occupy three high-order bits, and the CG index information may alternatively occupy five low-order bits.

The indication information is carried by the MAC CE, so that interaction between a MAC layer and a physical layer can be simplified, thereby shortening a processing delay.

The following describes a specific implementation of this application with reference to FIG. 11 by using an example.

FIG. 11 shows four CG transmission occasions indexed by using an index 0. The terminal transmits an I-frame on the 1st CG transmission occasion, but the transmission fails. It is assumed that an application layer of the terminal re-inserts a new I-frame on the 4th CG transmission occasion to transmit. In this case, because the I-frame on the 1st CG transmission occasion fails to be transmitted, even if P-frames originally prepared to be transmitted on the 2nd and $3^{rd}$ CG transmission occasions are successfully transmitted, decoding cannot be completed with reference to the I-frame transmitted on the $1^{st}$ CG transmission occasion. Therefore, it is unnecessary to perform the transmission again. To improve resource utilization, the terminal may skip transmitting the P-frames on the $2^{nd}$ and $3^{rd}$ CG transmission occasions, and send indication information to the radio access network device between the $1^{st}$ and $2^{nd}$ CG transmission occasions, to indicate to the radio access network device that the terminal is to skip data transmission on the $2^{nd}$ and $3^{rd}$ CG transmission occasions. After receiving the indication information, the radio access network device may know that the terminal skips the data transmission on the $2^{nd}$ and $3^{rd}$ CG transmission occasions, so that resources corresponding to the $2^{nd}$ and $3^{rd}$ CG transmission occasions may be allocated to another dynamically scheduled service of the terminal for use or another terminal for use, thereby improving resource utilization.

In part 1030, in a possible implementation in which the terminal skips the uplink data transmission on the N CG transmission occasions, the terminal does not generate MAC protocol data units (protocol data units, PDUs) on the N CG transmission occasions, or the terminal clears or releases cached data corresponding to the N CG transmission occasions.

In the method 1000, optionally, after receiving the indication information in part 1020, the radio access network device allocates, to the another terminal other than the terminal for use or the another dynamically scheduled service for use, all or some resources corresponding to the N CG transmission occasions. The radio access network device knows, via the indication information, that the terminal is to skip the uplink data transmission on the N CG transmission occasions, and may release some or all resources corresponding to the N CG transmission occasions, to further allocate these resources to the another terminal other than the terminal for use or the another dynamically scheduled service for use, thereby improving resource utilization.

For example, as shown in FIG. 11, the terminal skips the uplink data transmission on the $2^{nd}$ and $3^{rd}$ CG transmission occasions in the four CG transmission occasions. After knowing, via the indication information, that the terminal is to skip the uplink data transmission on the $2^{nd}$ and $3^{rd}$ CG transmission occasions, the radio access network device may allocate, to the another terminal for use or the another dynamically scheduled service of the terminal for use, some or all resources corresponding to the two CG transmission occasions.

When the terminal sends XR data (for example, picture data, video data, or other multimedia data), there may be a plurality of different methods for determining the quantity N of skipped CG transmission occasions.

In a possible implementation of determining N, when I-frames/P-frames are transmitted, a quantity of remaining I-frames and/or P-frames in a GOP may be determined as N. For example, if there are M I-frames and/or P-frames to be transmitted in a GOP, a quantity of successfully transmitted I-frames and/or P-frames is K, and a quantity of unsuccessfully transmitted I-frames and/or P-frames is M-K, M-K may be determined as N.

In another possible implementation of determining N, when an I-frame/a P-frame is transmitted, if an error occurs in the transmission of the I-frame, the physical layer feeds back the error to the application layer, and the application layer re-inserts the I-frame. This process requires a specific delay. The terminal may estimate the delay, and determine N based on the delay. For example, N may satisfy: N=floor (delay/T), delay is the delay, T is an arrival periodicity of a data frame, and floor(x) indicates rounding x down. An example in which the delay is 40 ms and the arrival periodicity of the data frame is 16.67 ms is used. N may satisfy: N=floor (40/16.67)=2.

In another possible implementation of determining N, when base layer data packets and enhancement layer data packets are transmitted, if an error occurs in transmission of a base layer data packet of a data frame, a quantity of CG transmission occasions within a remaining transmission time budget of the data frame may be determined as N. For example, N may satisfy: N=floor (DB/T), DB is the remaining transmission time budget, and T is the arrival periodicity of the data frame. An example in which the remaining transmission time budget is 40 ms and the arrival periodicity of the data frame is 16.67 ms is used. N may satisfy: N=floor (40/16.67)=2.

According to the foregoing implementation, the quantity N of CG transmission occasions that need to be skipped may be determined more accurately based on different source coding configurations or scenarios, so that a data transmission failure caused by excessively large N can be maximally avoided, and a resource waste caused by excessively small N can also be maximally avoided.

In an optional implementation A1 of the method 1000, the radio access network device sends logical channel configuration information to the terminal, and correspondingly, the terminal obtains the logical channel configuration information. The logical channel configuration information is used to configure a logical channel, and the logical channel configuration information is further used to configure the one or more CG transmission occasions that correspond to the logical channel and that the terminal is allowed to skip. The terminal may determine, based on the logical channel configuration information, to skip the CG transmission occasion corresponding to the logical channel, and send the indication information to the radio access network device based on part 1020 to indicate that the uplink data transmission is not performed on the N CG transmission occasions.

Optionally, the logical channel configuration information further includes a maximum quantity Y (where Y is an integer greater than 0) of terminal allowed transmission errors and/or skipped CG transmission occasions, and the terminal may determine, based on this information, the CG transmission occasion that needs to be skipped. The radio access network device may maintain a counter, and update the counter based on a transmission status of the terminal on the CG transmission occasions. When a count value of the counter reaches the maximum quantity Y, the radio access network device releases resources corresponding to remaining CG transmission occasions, and allocates the resources to the another terminal for use, thereby improving resource utilization. Releasing the resources corresponding to the remaining CG transmission occasions may also be understood as deactivating or disabling (disabling) CG configurations corresponding to the remaining CG transmission occasions.

According to the foregoing implementation, the terminal can know that when the quantity of terminal transmission errors and/or skipped CG transmission occasions is greater than Y, the network device releases/deactivates/disables (disables) the resources corresponding to the remaining CG transmission occasions corresponding to the logical channel, so that the terminal can be prompted or encouraged to send the indication information to the network device in time.

The radio access network device may update the counter according to the following mechanism, to improve motivation of the terminal to report the indication information to the radio access network device.

When the terminal fails to transmit data on L (where L is an integer greater than 0) CG transmission occasions (where a possible cause is that the terminal performs the data transmission on these CG transmission occasions but the transmission fails, or the terminal skips the transmission on these CG transmission occasions), but the terminal does not send the indication information to the radio access network device, the radio access network device updates the counter by adding L. When the terminal skips the data transmission on the L CG transmission occasions, and sends the indication information to the radio access network device to indicate that the data transmission on these CG transmission occasions is skipped, the radio access network device does not update the counter. In this manner of updating the counter, the terminal may be encouraged to report the skipped CG transmission occasions to the radio access network device via the indication information. Because the reporting of the terminal can reduce a possibility that the CG configurations corresponding to the CG transmission occasions is deactivated, the terminal may expect to occupy more CG transmission occasions to perform the data transmission.

The following uses FIG. 13 as an example to describe an update mechanism of the counter. FIG. 13 shows seven CG transmission occasions, and a terminal skips data transmission on the $2^{nd}$ $3^{rd}$, $5^{th}$, and $6^{th}$ CG transmission occasions. The terminal does not send the foregoing indication information to a radio access network device when skipping the $2^{nd}$ and $3^{rd}$ CG transmission occasions, and sends the indication information to the radio access network device when skipping the $5^{th}$ and $6^{th}$ CG transmission occasions. A maximum quantity of terminal allowed transmission errors and/or skipped CG transmission occasions is Y, and the foregoing counter maintained by the radio access network device is initialized to 0. The radio access network device does not successfully receive data from the terminal on the $2^{nd}$ and $3^{rd}$ CG transmission occasions, and does not receive the indication information indicating to skip the two CG transmission occasions. Therefore, the radio access network device updates the counter by adding 2. The radio access network device does not successfully receive the data from the terminal on the $5^{th}$ and $6^{th}$ CG transmission occasions, but receives the indication information indicating the terminal to skip the two CG transmission occasions. In this case, the radio access network device does not update the counter, and a count value of the counter is still 2. When $Y \leq 2$, the radio access network device decides to release resources corresponding to remaining CG transmission occasions, and may allocate these released resources to another terminal for use.

The logical channel configuration information may be a LogicalChannelConfig information element in an RRC message, and the information element includes an information element for configuring a logical channel. In addition, the LogicalChannelConfig information element further includes a SkipUplinkTxConfigured information element. The SkipUplinkTxConfigured information element is for configuring the CG transmission occasion that corresponds to the logical channel and that the terminal is allowed to skip. For example, the LogicalChannelConfig and SkipUplinkTxConfigured information elements may be shown in the following table:

TABLE 1

| LogicalChannelConfig::= | SEQUENCE { |
|---|---|
| ... | |
| SkipUplinkTxConfigured | ENUMERATED {enabled, disabled} |
| ... | |
| } | |

In the table, an example in which a value indicated by the SkipUplinkTxConfigured information element is an enumerated value: "enabled" or "disabled" is used. When the SkipUplinkTxConfigured information element is configured as "enabled", it indicates that the terminal is allowed to skip the CG transmission occasion corresponding to the logical channel. When the SkipUplinkTxConfigured information element is configured as "disabled", it indicates that the terminal is not allowed to skip the CG transmission occasion corresponding to the logical channel.

In addition, the LogicalChannelConfig information element may further optionally include a maxAllowedSkipSize information element, for configuring the maximum quantity Y of terminal allowed transmission errors and/or skipped CG transmission occasions. For example, the maxAllowedSkipSize information element may indicate a maximum quantity of 16 different terminal allowed transmission errors and/or skipped CG transmission occasions. For example, the maxAllowedSkipSize information element included in the LogicalChannelConfig information element may be shown in the following table, where INTEGER (1 . . . 16) indicates that the maxAllowedSkipSize information element is for configuring a value range of the maximum quantity Y of terminal allowed transmission errors and/or skipped CG transmission occasions: 1, 2, . . . , and 16.

TABLE 2

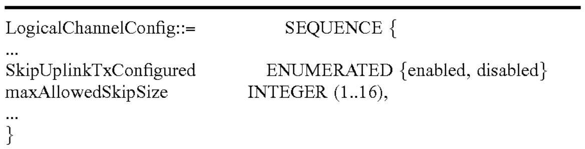

| LogicalChannelConfig::= | SEQUENCE { |
|---|---|
| ... | |
| SkipUplinkTxConfigured | ENUMERATED {enabled, disabled} |
| maxAllowedSkipSize | INTEGER (1..16), |
| ... | |
| } | |

In another optional implementation A2 of the method 1000, the CG information is further used to configure the foregoing one or more CG transmission occasions that the terminal is allowed to skip. The terminal may determine, based on the CG information, to skip the CG transmission occasion configured by using the CG information, and send the indication information to the radio access network device based on part 1020 to indicate that uplink data transmission is not performed on the N CG transmission occasions.

Optionally, the CG information further includes a maximum quantity Z (where Z is an integer greater than 0) of terminal allowed transmission errors and/or skipped CG transmission occasions, and the terminal may determine, based on this information, the CG transmission occasion that needs to be skipped. The radio access network device may maintain a counter, and update the counter based on a transmission status of the terminal on the CG transmission occasions. When a count value of the counter reaches the maximum quantity Z, the radio access network device releases resources corresponding to the remaining CG transmission occasions, and allocates the resources to the another terminal for use, thereby improving resource utilization.

In this implementation, the terminal can know that when the quantity of terminal transmission errors and/or skipped CG transmission occasions is greater than Z, the network device releases/deactivates/disables (disables) resources corresponding to the remaining CG transmission occasions, so that the terminal can be prompted or encouraged to send the indication information to the network device in time.

The CG information may be a ConfiguredGrantConfig information element in an RRC message, and the information element includes an information element for configuring CG. In addition, the ConfiguredGrantConfig information element further includes a SkipUplinkTxConfigured information element. The SkipUplinkTxConfigured information element is for configuring the CG transmission occasion that is configured by using the CG information and that the terminal is allowed to skip. For example, the ConfiguredGrantConfig and SkipUplinkTxConfigured information elements may be shown in the following table:

TABLE 3

| | |
|---|---|
| ConfiguredGrantConfig::= | SEQUENCE { |
| ... | |
| SkipUplinkTxConfigured | ENUMERATED {enabled, disabled} |
| ... | |
| } | |

In the table, an example in which a value indicated by the SkipUplinkTxConfigured information element is an enumerated value: "enabled" or "disabled" is used. When the SkipUplinkTxConfigured information element is configured as "enabled", it indicates that the terminal is allowed to skip the CG transmission occasion configured by using the CG information. When the SkipUplinkTxConfigured information element is configured as "disabled", it indicates that the terminal is not allowed to skip the CG transmission occasion configured by using the CG information.

In addition, the ConfiguredGrantConfig information element may further optionally include a maxAllowedSkipSize information element, for configuring the maximum quantity Z of terminal allowed transmission errors and/or skipped CG transmission occasions. For example, the maxAllowedSkipSize information element may indicate a maximum quantity of 16 different terminal allowed transmission errors and/or skipped CG transmission occasions. For example, the maxAllowedSkipSize information element included in the ConfiguredGrantConfig information element may be shown in the following table, where INTEGER (1 . . . 16) indicates that the maxAllowedSkipSize information element is for configuring a value range of the maximum quantity Z of terminal allowed transmission errors and/or skipped CG transmission occasions: 1, 2, . . . , and 16.

TABLE 4

| | |
|---|---|
| ConfiguredGrantConfig::= | SEQUENCE { |
| ... | |
| SkipUplinkTxConfigured | ENUMERATED {enabled, disabled} |
| maxAllowedSkipSize | INTEGER (1..16), |
| ... | |
| } | |

Corresponding to the method provided in the foregoing method embodiments, embodiments of this application further provide a corresponding apparatus, including a corresponding module configured to execute the foregoing embodiments. The module may be software, hardware, or a combination of software and hardware.

Figure 14:
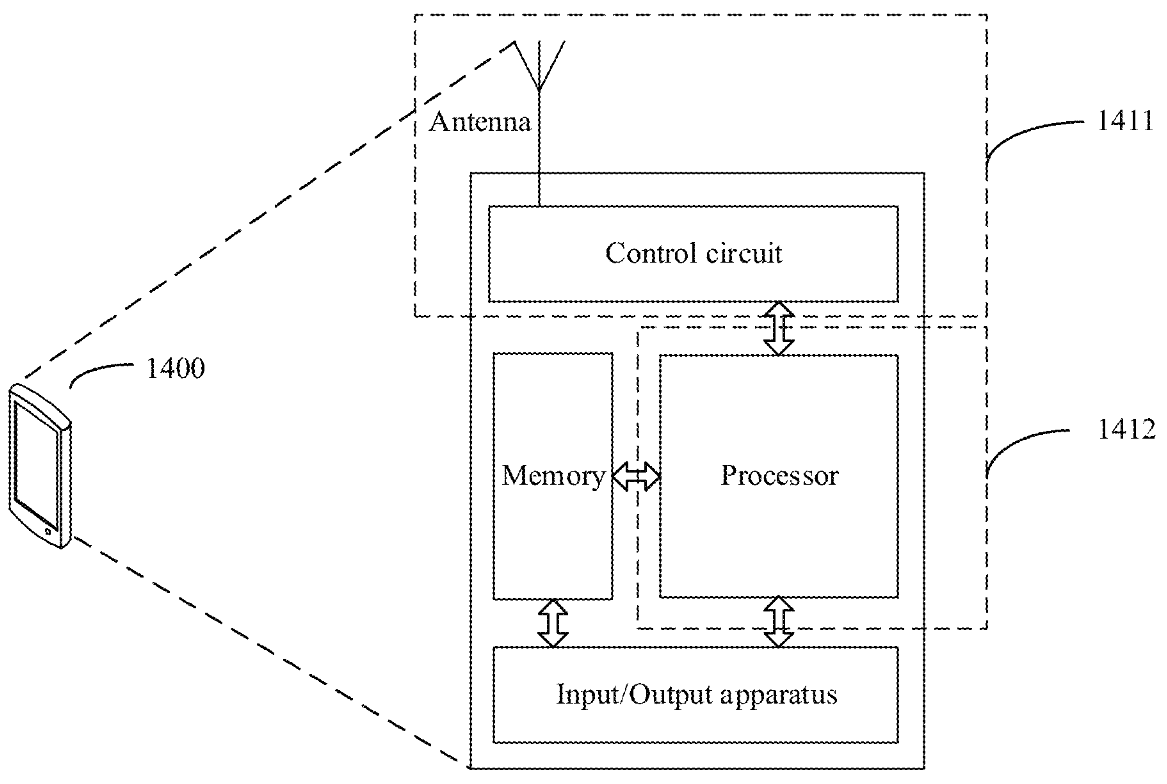
FIG. 14 is a diagram of a structure of a terminal according to an embodiment of this application.

FIG. 14 is a diagram of a structure of a terminal. The terminal is applicable to the scenario shown in FIG. 1, FIG. 2, FIG. 3, FIG. 4, or FIG. 5. The terminal or a component in the terminal may perform the foregoing method 1000 and various possible implementations. For ease of description, FIG. 14 shows only main components of the terminal. As shown in FIG. 14, the terminal 1400 includes a processor, a memory, a control circuit, an antenna, and an input/output apparatus. The processor is mainly configured to: process a communication protocol and communication data, control the entire terminal, execute a software program, and process data of the software program. The memory is mainly configured to store the software program and the data. A radio frequency circuit is mainly configured to: perform conversion between a baseband signal and a radio frequency signal, and process the radio frequency signal. The antenna is mainly configured to: receive and send the radio frequency signal in a form of an electromagnetic wave. The input/output apparatus, such as a touchscreen, a display, or a keyboard, is mainly configured to: receive data input by a user and output data to the user.

After the terminal is powered on, the processor may read a software program in a storage unit, interpret and execute instructions of the software program, and process data of the software program. When data needs to be sent in a wireless manner, the processor performs baseband processing on the to-be-sent data, and outputs a baseband signal to the radio frequency circuit. The radio frequency circuit processes the baseband signal to obtain a radio frequency signal, and sends the radio frequency signal to the outside in an electromagnetic wave form through the antenna. When data is sent to the terminal, the radio frequency circuit receives the radio frequency signal through the antenna, further converts the radio frequency signal into a baseband signal, and outputs the baseband signal to the processor. The processor converts the baseband signal into data, and processes the data.

For ease of description, FIG. 14 shows only one memory and one processor. In an actual terminal, there may be a plurality of processors and a plurality of memories. The memory may also be referred to as a storage medium, a storage device, or the like. This is not limited in embodiments of this application.

In an optional implementation, the processor may include a baseband processor and a central processing unit. The baseband processor is mainly configured to process the communication protocol and the communication data. The central processing unit is mainly configured to control the entire terminal device, execute the software program, and process the data of the software program. The processor in FIG. 14 integrates functions of the baseband processor and the central processing unit. A person skilled in the art may understand that the baseband processor and the central processing unit may alternatively be independent processors, and are interconnected by using a technology such as a bus. A person skilled in the art may understand that the terminal may include a plurality of baseband processors to adapt to different network standards, the terminal may include a plurality of central processing units to enhance a processing capability of the terminal, and components of the terminal may be connected through various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of the software program, and the processor executes the software program to implement a baseband processing function.

In an example, the antenna and the control circuit that have sending and receiving functions may be considered as a transceiver unit 1411 of the terminal 1400, and the processor having a processing function may be considered as a processing unit 1412 of the terminal 1400. As shown in FIG. 14, the terminal 1400 includes the transceiver unit 1411 and the processing unit 1412. The transceiver unit may also be referred to as a transceiver, a transceiver machine, a transceiver apparatus, or the like. Optionally, a device that is in the transceiver unit 1411 and that is configured to implement the receiving function may be considered as a receiving unit, and a device that is in the transceiver unit 1411 and that is configured to implement the sending function may be considered as a sending unit. In other words, the transceiver unit 1411 includes the receiving unit and the sending unit. For example, the receiving unit may also be referred to as a receiver machine, a receiver, a receive circuit, or the like, and the sending unit may also be referred to as a transmitter machine, a transmitter, a transmit circuit, or the like. Optionally, the receiving unit and the sending unit may be one integrated unit, or may be a plurality of independent units. The receiving unit and the sending unit may be at one geographical location, or may be distributed at a plurality of geographical locations.

Figure 15:
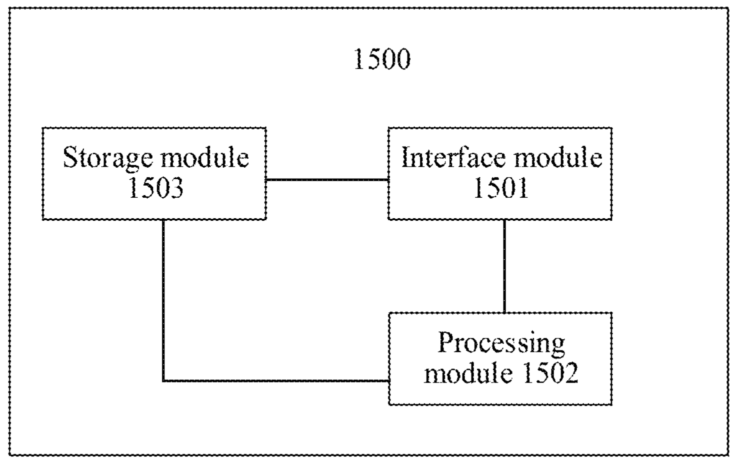
FIG. 15 is a diagram of a structure of an apparatus according to an embodiment of this application.

As shown in FIG. 15, another embodiment of this application provides an apparatus 1500. The apparatus may be a terminal, or may be a component (for example, an integrated circuit or a chip) of the terminal. Alternatively, the apparatus may be a radio access network device, a component (for example, an integrated circuit or a chip) of the network device, or a logical module or software that can implement all or some functions of the radio access network device. The apparatus may alternatively be another communication module. For example, the apparatus 1500 may implement the functions of the radio access network device in the method 1000, or the apparatus 1500 may implement the functions of the terminal in the method 1000. The apparatus 1500 may include: an interface module 1501 (or referred to as an interface unit). Optionally, the apparatus may further include a processing module 1502 (or referred to as a processing unit) and a storage module 1503 (or referred to as a storage unit).

In a possible design, one or more modules in FIG. 15 may be implemented by one or more processors, may be implemented by one or more processors and one or more memories, may be implemented by one or more processors and one or more transceivers, or may be implemented by one or more processors, one or more memories, and one or more transceivers. This is not limited in embodiments of this application. The processor, the memory, and the transceiver may be disposed separately, or may be integrated.

The apparatus has a function of implementing the terminal described in embodiments of this application. For example, the apparatus includes a corresponding module, unit, or means (means) used for the terminal to perform the steps that are related to the terminal and that are described in embodiments of this application. The function, the unit, or the means (means) may be implemented by software or hardware, may be implemented by hardware executing corresponding software, or may be implemented by a combination of software and hardware. For details, further refer to the corresponding descriptions in the foregoing corresponding method embodiment. Alternatively, the apparatus has a function of implementing the radio access network device described in embodiments of this application. For example, the apparatus includes a corresponding module, unit, or means (means) used for the radio access network device to perform the steps that are related to the radio access network device and that are described in embodiments of this application. The function, the unit, or the means (means) may be implemented by software or hardware, may be implemented by hardware executing corresponding software, or may be implemented by a combination of software and hardware. For details, further refer to the corresponding descriptions in the foregoing corresponding method embodiment.

In a possible design, the apparatus 1500 includes a processing module 1502 and an interface module 1501. The interface module 1501 is configured to obtain CG information from a network device, where the CG information is for configuring one or more CG transmission occasions, and the one or more CG transmission occasions are used for uplink data transmission. The interface module 1501 is further configured to send indication information to the network device, where the indication information indicates that uplink data transmission is not performed on N CG transmission occasions of the one or more CG transmission occasions, and N is a positive integer. The processing module 1502 is configured to control the apparatus to skip the uplink data transmission on the N CG transmission occasions. Optionally, the CG information is carried in an RRC message. For example, the CG information may be a ConfiguredGrantConfig information element in the RRC message.

In some possible implementations of the apparatus 1500, the indication information includes CG transmission occasion quantity information, and the CG transmission occasion quantity information indicates N. The CG transmission occasion quantity information may be understood as a quantity that is of CG transmission occasions skipped by the terminal and that is indicated to the network device. Optionally, the CG transmission occasion quantity information may be optional information. When the indication information includes the CG transmission occasion quantity information, the CG transmission occasion quantity information indicates the quantity of skipped CG transmission occasions. When the indication information does not include the CG transmission occasion quantity information, a predefined quantity of CG transmission occasions are skipped by default, and the predefined quantity may be, for example, 1.

In some possible implementations of the apparatus 1500, the indication information includes CG index information, and the CG index information indicates the one or more CG transmission occasions. The one or more CG transmission occasions may be indexed by using the CG index information.

In some possible implementations of the apparatus 1500, the indication information is included in UCI, or the indication information is carried by a MAC CE.

When the indication information is included in the UCI, optionally, the UCI may be carried on a PUSCH or a PUCCH. Optionally, the UCI is CG-UCI, and the CG-UCI is used to send CG-related control information to the network device. The CG-UCI may include only the indication information, or may include the indication information and other information. For example, the other information includes one or more of the following information: HARQ information, RV information, NDI information, or COT sharing information. The HARQ information indicates a HARQ process number corresponding to the uplink data transmission, the RV information indicates an RV corresponding to the uplink data transmission, the NDI information indicates whether the uplink data transmission is new data, and the COT sharing information indicates channel occupancy time information in an unlicensed frequency band communication scenario.

The indication information in the UCI may include the CG transmission occasion quantity information and/or the CG index information. When the indication information includes the CG transmission occasion quantity information, for example, a field occupied by the CG transmission occasion quantity information may include three bits, a maximum quantity of eight different skipped CG transmission occasions may be indicated. When the indication information includes the CG index information, for example, a field occupied by the CG index information may include four bits, considering that a maximum of 12 groups of CG transmission occasions with different indexes are configured for a terminal on one BWP, the CG index information may indicate the maximum of 12 groups of CG transmission occasions with the different indexes. In this case, it may be understood as that the CG index information indicates a CG index at a physical layer.

When the indication information is carried by the MAC CE, optionally, the indication information may include the CG transmission occasion quantity information and/or the CG index information. When the indication information includes the CG transmission occasion quantity information, for example, a field occupied by the CG transmission occasion quantity information may include three bits, a maximum quantity of eight different skipped CG transmission occasions may be indicated. When the indication information includes the CG index information, for example, a field occupied by the CG index information may include five bits, considering that a maximum of 32 groups of CG transmission occasions with different indexes are configured for a terminal on one MAC entity, the CG index information may indicate the maximum of 32 groups of CG transmission occasions with the different indexes. In this case, it may be understood as that the CG index information indicates a CG index at a MAC layer.

In some possible implementations of the apparatus 1500, there are a plurality of different implementations of skipping the uplink data transmission on the N CG transmission occasions.

In a possible implementation, MAC PDUs on the N CG transmission occasions may not be generated.

In another possible implementation, cached data corresponding to the N CG transmission occasions may be cleared or released.

In some possible implementations of the apparatus 1500, uplink data includes picture data, and a value of N is determined based on a quantity of remaining data frames in a GOP, a delay of inserting a data frame, or a remaining transmission delay budget of the data frame.

For example, when I-frames/P-frames are transmitted, a quantity of remaining I-frames and/or P-frames in a GOP may be determined as N.

For another example, when an I-frame/a P-frame is transmitted, if an error occurs in the transmission of the I-frame, the physical layer feeds back the error to an application layer, and the application layer re-inserts the I-frame. This process requires a specific delay. A terminal side may estimate the delay, and determine N based on the delay.

For another example, when base layer data packets and enhancement layer data packets are transmitted, if an error occurs in transmission of a base layer data packet of a data frame, a quantity of CG transmission occasions within a remaining transmission time budget of the data frame may be determined as N.

In some possible implementations of the apparatus 1500, the interface module 1501 is further configured to obtain logical channel configuration information from the network device, where the logical channel configuration information is used to configure a logical channel, and the logical channel configuration information is for configuring the one or more CG transmission occasions that correspond to the logical channel and that are allowed to be skipped. The terminal side may determine, based on the logical channel configuration information, to skip the CG transmission occasion corresponding to the logical channel, and send indication information to the network device to indicate that uplink data transmission is not performed on the N CG transmission occasions. Optionally, the logical channel configuration information further includes a maximum quantity Y (where Y is an integer greater than 0) of terminal allowed transmission errors and/or skipped CG transmission occasions, and the terminal side may determine, based on this information, the CG transmission occasion that needs to be skipped.

The logical channel configuration information may be a LogicalChannelConfig information element in an RRC message, and the information element includes an information element for configuring the logical channel. The LogicalChannelConfig information element may further include a SkipUplinkTxConfigured information element. The SkipUplinkTxConfigured information element is for configuring the CG transmission occasion that corresponds to the logical channel and that the terminal is allowed to skip. In addition, the LogicalChannelConfig information element may further optionally include a maxAllowedSkipSize information element, for configuring the maximum quantity Y of terminal allowed transmission errors and/or skipped CG transmission occasions.

In some possible implementations of the apparatus 1500, the CG information is further for configuring the one or more CG transmission occasions allowed to be skipped. The terminal side may determine, based on the CG information, to skip the CG transmission occasion configured by using the CG information, and send the indication information to the network device to indicate that the uplink data transmission is not performed on the N CG transmission occasions. Optionally, the CG information further includes a maximum quantity Z (where Z is an integer greater than 0) of terminal allowed transmission errors and/or skipped CG transmission occasions, and the terminal may determine, based on this information, the CG transmission occasion that needs to be skipped.

The CG information may be a ConfiguredGrantConfig information element in an RRC message, and the information element includes an information element for configuring CG. The ConfiguredGrantConfig information element may further include a SkipUplinkTxConfigured information element. The SkipUplinkTxConfigured information element is for configuring the CG transmission occasion that is configured by using the CG information and that the terminal is allowed to skip. In addition, the ConfiguredGrantConfig information element may further optionally include a maxAllowedSkipSize information element, for configuring the maximum quantity Z of terminal allowed transmission errors and/or skipped CG transmission occasions.

In another possible design, the apparatus 1500 includes a processing module 1502 and an interface module 1501. The interface module 1501 is configured to send CG information to the terminal, where the CG information is for configuring one or more CG transmission occasions, and the one or more CG transmission occasions are used for uplink data transmission. The interface module 1501 is further configured to receive indication information from the terminal, where the indication information indicates that the terminal does not perform uplink data transmission on N CG transmission occasions of the one or more CG transmission occasions, and N is a positive integer. The processing module 1502 is configured to control the apparatus to skip uplink data reception from the terminal on the N CG transmission occasions. Optionally, the CG information is carried in an RRC message. For example, the CG information may be a ConfiguredGrantConfig information element in the RRC message.

In some possible implementations of the apparatus 1500, the indication information includes CG transmission occasion quantity information, and the CG transmission occasion quantity information indicates N. The CG transmission occasion quantity information may be understood as a quantity that is of CG transmission occasions skipped by the terminal and that is indicated to a network device.

Optionally, the CG transmission occasion quantity information may be optional information. When the indication information includes the CG transmission occasion quantity information, the CG transmission occasion quantity information indicates the quantity of skipped CG transmission occasions. When the indication information does not include the CG transmission occasion quantity information, a predefined quantity of CG transmission occasions are skipped by default, and the predefined quantity may be, for example, 1.

In some possible implementations of the apparatus 1500, the indication information includes CG index information, and the CG index information indicates the one or more CG transmission occasions. The one or more CG transmission occasions may be indexed by using the CG index information.

In some possible implementations of the apparatus 1500, the indication information is included in UCI, or the indication information is carried by a MAC CE.

When the indication information is included in the UCI, optionally, the UCI may be carried on a PUSCH or a PUCCH. Optionally, the UCI is CG-UCI, and the CG-UCI is used to send CG-related control information to the network device. The CG-UCI may include only the indication information, or may include the indication information and other information. For example, the other information includes one or more of the following information: HARQ information, RV information, NDI information, or COT sharing information. The HARQ information indicates a HARQ process number corresponding to the uplink data transmission, the RV information indicates an RV corresponding to the uplink data transmission, the NDI information indicates whether the uplink data transmission is new data, and the COT sharing information indicates channel occupancy time information in an unlicensed frequency band communication scenario.

The indication information in the UCI may include the CG transmission occasion quantity information and/or the CG index information. When the indication information includes the CG transmission occasion quantity information, for example, a field occupied by the CG transmission occasion quantity information may include three bits, a maximum quantity of eight different skipped CG transmission occasions may be indicated. When the indication information includes the CG index information, for example, a field occupied by the CG index information may include four bits, considering that a maximum of 12 groups of CG transmission occasions with different indexes are configured for a terminal on one BWP, the CG index information may indicate the maximum of 12 groups of CG transmission occasions with the different indexes. In this case, it may be understood as that the CG index information indicates a CG index at a physical layer.

When the indication information is carried by the MAC CE, optionally, the indication information may include the CG transmission occasion quantity information and/or the CG index information. When the indication information includes the CG transmission occasion quantity information, for example, a field occupied by the CG transmission occasion quantity information may include three bits, a maximum quantity of eight different skipped CG transmission occasions may be indicated. When the indication information includes the CG index information, for example, a field occupied by the CG index information may include five bits, considering that a maximum of 32 groups of CG transmission occasions with different indexes are configured for a terminal on one MAC entity, the CG index information may indicate the maximum of 32 groups of CG transmission occasions with the different indexes. In this case, it may be understood as that the CG index information indicates a CG index at a MAC layer.

In some possible implementations of the apparatus 1500, the processing module 1502 is further configured to allocate, to another terminal other than the terminal for use or another service for use, all or some resources corresponding to the N CG transmission occasions.

In some possible implementations of the apparatus 1500, the interface module 1501 is further configured to send logical channel configuration information to the terminal, where the logical channel configuration information is used to configure a logical channel, and the logical channel configuration information is for configuring the one or more CG transmission occasions that correspond to the configured logical channel and that are allowed to be skipped.

Optionally, the logical channel configuration information further includes a maximum quantity Y (where Y is an integer greater than 0) of terminal allowed transmission errors and/or skipped CG transmission occasions. The network device may maintain a counter, and update the counter based on a transmission status of the terminal on the CG transmission occasions. When a count value of the counter reaches the maximum quantity Y, the network device releases resources corresponding to the remaining CG transmission occasions, and allocates the resources to another terminal for use. Releasing the resources corresponding to the remaining CG transmission occasions may also be understood as deactivating CG configurations corresponding to the remaining CG transmission occasions.

Optionally, the network device may update the counter according to the following mechanism. When the terminal fails to transmit data on L (where L is an integer greater than 0) CG transmission occasions (where a possible cause is that the terminal performs the data transmission on these CG transmission occasions but the transmission fails, or the terminal skips the transmission on these CG transmission occasions), but the terminal does not send the indication information, the network device updates the counter by adding L. When the terminal skips the data transmission on the L CG transmission occasions, and sends the indication information to indicate that the data transmission on these CG transmission occasions is skipped, the network device does not update the counter.

The logical channel configuration information may be a LogicalChannelConfig information element in an RRC message, and the information element includes an information element for configuring the logical channel. The LogicalChannelConfig information element may further include a SkipUplinkTxConfigured information element. The SkipUplinkTxConfigured information element is for configuring the CG transmission occasion that corresponds to the logical channel and that the terminal is allowed to skip. In addition, the LogicalChannelConfig information element may further optionally include a maxAllowedSkipSize information element, for configuring the maximum quantity Y of terminal allowed transmission errors and/or skipped CG transmission occasions.

In some possible implementations of the apparatus 1500, the CG information is further for configuring the one or more CG transmission occasions allowed to be skipped. Optionally, the CG information further includes a maximum quantity Z (where Z is an integer greater than 0) of terminal allowed transmission errors and/or skipped CG transmission occasions. The network device may maintain a counter, and update the counter based on a transmission status of the terminal on the CG transmission occasions. When a count value of the counter reaches the maximum quantity Z, the network device releases resources corresponding to the remaining CG transmission occasions, and allocates the resources to another terminal for use.

The CG information may be a ConfiguredGrantConfig information element in an RRC message, and the information element includes an information element for configuring CG. The ConfiguredGrantConfig information element may further include a SkipUplinkTxConfigured information element. The SkipUplinkTxConfigured information element is for configuring the CG transmission occasion that is configured by using the CG information and that the terminal is allowed to skip. In addition, the ConfiguredGrantConfig information element may further optionally include a maxAllowedSkipSize information element, for configuring the maximum quantity Z of terminal allowed transmission errors and/or skipped CG transmission occasions.

It may be understood that, for beneficial effects corresponding to the apparatus 1500 and various possible implementations, refer to the descriptions in the foregoing method embodiments or Summary. Details are not described herein again.

Optionally, the apparatus 1500 may further include the storage module 1503, configured to store data or instructions (which may also be referred to as code or a program). The another module may interact with or be coupled to the storage module, to implement a corresponding method or function. For example, the processing module 1502 may read the data or the instructions in the storage module 1503, so that the apparatus 1500 implements the method in the foregoing embodiment.

For example, the module in the foregoing apparatus may be one or more integrated circuits configured to implement the foregoing method, for example, one or more application-specific integrated circuits (application-specific integrated circuits, ASICs), one or more microprocessors (digital signal processors, DSPs), one or more field programmable gate arrays (field programmable gate arrays, FPGAs), or a combination of at least two of these integrated circuit forms. For another example, when the module in the apparatus may be implemented by scheduling a program by a processing element, the processing element may be a general-purpose processor, for example, a central processing unit (central processing unit, CPU) or another processor that can invoke the program. For still another example, these units may be integrated and implemented in a form of a system-on-a-chip (system-on-a-chip, SoC).

Figure 16:
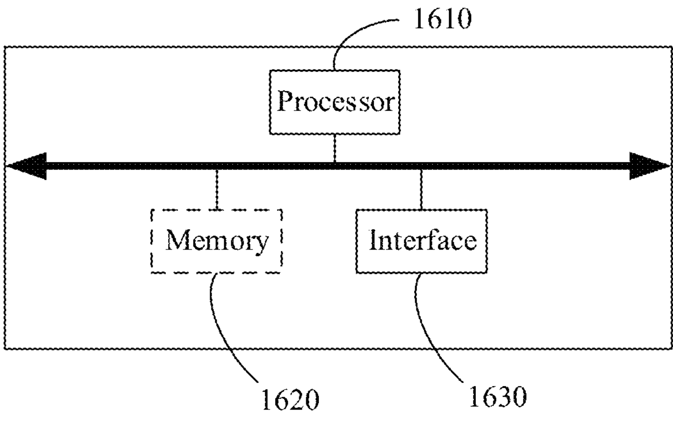
FIG. 16 is a diagram of another apparatus according to an embodiment of this application.

FIG. 16 is a diagram of an apparatus according to an embodiment of this application. The apparatus may be configured to implement the foregoing method 1000 and various possible implementations. As shown in FIG. 16, the apparatus includes a processor 1610 and an interface 1630, and the processor 1610 is coupled to the interface 1630. The interface 1630 is configured to communicate with another module or device. The interface 1630 may be a transceiver or an input/output interface. The interface 1630 may be, for example, an interface circuit. Optionally, the apparatus further includes a memory 1620, configured to: store instructions executed by the processor 1610, store input data for the processor 1610 to run the instructions, or store data generated after the processor 1610 runs the instructions.

The method 1000 and the various possible implementations may be implemented by the processor 1610 by invoking the program or the instructions stored in the memory 1620. The memory 1620 may be inside the apparatus, or may be outside the apparatus. This is not limited in this application.

Optionally, functions/implementation processes of the interface module 1501 and the processing module 1502 in FIG. 15 may be implemented by using the processor 1610 in the apparatus shown in FIG. 16. Alternatively, functions/implementation processes of the processing module 1502 in FIG. 15 may be implemented by using the processor 1610 in the apparatus shown in FIG. 16, and functions/implementation processes of the interface module 1501 in FIG. 15 may be implemented by the interface 1630 in the apparatus shown in FIG. 16. For example, the functions/implementation processes of the interface module 1501 may be implemented by the processor by invoking program instructions in the memory to drive the interface 1630.

When the apparatus is a chip used in a terminal, the chip in the terminal implements functions of the terminal in the foregoing method embodiments. The chip receives information from another module (for example, a radio frequency module or an antenna) in the terminal, where the information is from another terminal or a radio access network device; or the chip sends information to another module (for example, a radio frequency module or an antenna) in the terminal, where the information is sent by the terminal to another terminal or a radio access network device.

When the apparatus is a chip used in a radio access network device, the chip implements functions of the radio access network device in the foregoing method embodiments. The chip receives information from another module (for example, a radio frequency module or an antenna) in the radio access network device, where the information is from another radio access network device or a terminal; or the chip sends information to another module (for example, a radio frequency module or an antenna) in the radio access network device, where the information is sent by the radio access network device to another radio access network device or a terminal.

A person of ordinary skill in the art may understand that various numbers such as first and second in this application are merely used for differentiation for ease of description, and are not used to limit the scope of embodiments of this application or represent a sequence. "And/or" describes an association relationship for describing associated objects and represents that three relationships may exist. For example, A and/or B may represent the following three cases: Only A exists, both A and B exist, and only B exists. The character "/" usually indicates an "or" relationship between the associated objects. "At least one" means one or more. At least two means two or more. "At least one", "any one", or a similar expression thereof indicates any combination of the items, and includes a singular item (piece) or any combination of plural items (pieces). For example, at least one of a, b, or c may indicate: a, b, c, a and b, a and c, b and c, or a, b, and c, where a, b, and c may be singular or plural. "A plurality of" means two or more, and another quantifier is similar to this.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state drive (solid-state drive, SSD)), or the like.

Steps of the methods described in embodiments of this application may be directly embedded into hardware, a software unit executed by a processor, or a combination thereof. The software unit may be stored in a random access memory (random access memory, RAM), a flash memory, a read-only memory (read-only memory, ROM), a register, a hard disk drive, a removable disk, or a storage medium in any other form in the art. For example, the storage medium may connect to a processor, so that the processor may read information from the storage medium and write information into the storage medium. Optionally, the storage medium may be integrated into a processor. The processor and the storage medium may be disposed in an ASIC.

This application further provides a computer-readable medium. The computer-readable medium stores a computer program, and when the computer program is executed by a computer, functions of any one of the foregoing method embodiments are implemented.

This application further provides a computer program product. When the computer program product is executed by a computer, functions of any one of the foregoing method embodiments are implemented.

For same or similar parts in embodiments of this application, refer to each other. In embodiments of this application and the implementations/methods/implementation methods in embodiments, unless otherwise specified or a logical collision occurs, terms and/or descriptions are consistent and may be mutually referenced between different embodiments and between the implementations/methods/implementation methods in embodiments. Technical features in the different embodiments and the implementations/methods/implementation methods in embodiments may be combined to form a new embodiment, implementation, method, or implementation method based on an internal logical relationship thereof. The foregoing descriptions are implementations of this application, but are not intended to limit the protection scope of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. A communication method, comprising:

obtaining configured grant (CG) information from a network device, wherein the CG information is for configuring one or more CG transmission occasions, and the one or more CG transmission occasions are used for uplink data transmission;

sending indication information to the network device, wherein the indication information indicates that uplink data transmission will not be performed on N CG transmission occasions of the one or more CG transmission occasions, and N is a positive integer; and skipping the uplink data transmission on the N CG transmission occasions.

2. The method according to claim 1, wherein the indication information comprises CG transmission occasion quantity information, and the CG transmission occasion quantity information indicates N.

3. The method according to claim 1, wherein the indication information comprises CG index information, and the CG index information indicates the one or more CG transmission occasions.

4. The method according to claim 1, wherein the indication information is comprised in uplink control information (UCI).

5. The method according to claim 4, wherein the UCI is carried on a physical uplink shared channel (PUSCH).

6. The method according to claim 1, wherein uplink data comprises picture data, and a value of N is determined based on one of the following:

a quantity of remaining data frames in a group of pictures (GOP);

a delay of inserting a data frame; or a remaining transmission delay budget of the data frame.

7. The method according to claim 1, wherein the CG information is further for configuring the one or more CG transmission occasions allowed to be skipped.

8. An apparatus, comprising:

one or more processors to execute instructions causing the apparatus to:

obtain configured grant (CG) information from a network device, wherein the CG information is for configuring one or more CG transmission occasions, and the one or more CG transmission occasions are used for uplink data transmission;

send indication information to the network device, wherein the indication information indicates that uplink data transmission will not be performed on N CG transmission occasions of the one or more CG transmission occasions, and N is a positive integer; and skip the uplink data transmission on the N CG transmission occasions.

9. The apparatus according to claim 8, wherein the indication information comprises CG transmission occasion quantity information, and the CG transmission occasion quantity information indicates N.

10. The apparatus according to claim 8, wherein the indication information comprises CG index information, and the CG index information indicates the one or more CG transmission occasions.

11. The apparatus according to claim 8, wherein the indication information is comprised in uplink control information (UCI).

12. The apparatus according to claim 11, wherein the UCI is carried on a physical uplink shared channel (PUSCH).

13. The apparatus according to claim 8, wherein uplink data comprises picture data, and a value of N is determined based on one of the following:

a quantity of remaining data frames in a group of pictures (GOP);

a delay of inserting a data frame; or a remaining transmission delay budget of the data frame.

14. The apparatus according to claim 8, wherein the CG information is further for configuring the one or more CG transmission occasions allowed to be skipped.

15. A non-transitory computer readable medium storing instructions that are executable by a computer, the non-transitory computer readable medium is applied to a first communication apparatus, and the instructions comprise instructions for:

obtaining configured grant (CG) information from a network device, wherein the CG information is for configuring one or more CG transmission occasions, and the one or more CG transmission occasions are used for uplink data transmission;

sending indication information to the network device, wherein the indication information indicates that uplink data transmission will not be performed on N CG transmission occasions of the one or more CG transmission occasions, and N is a positive integer; and skipping the uplink data transmission on the N CG transmission occasions.

16. The non-transitory computer readable medium according to claim 15, wherein the indication information comprises CG transmission occasion quantity information, and the CG transmission occasion quantity information indicates N.

17. The non-transitory computer readable medium according to claim 15, wherein the indication information is comprised in uplink control information (UCI).

18. The non-transitory computer readable medium according to claim 17, wherein the UCI is carried on a physical uplink shared channel (PUSCH).

19. The non-transitory computer readable medium according to claim 15, wherein uplink data comprises picture data, and a value of N is determined based on one of the following:

a quantity of remaining data frames in a group of pictures (GOP);

a delay of inserting a data frame; or a remaining transmission delay budget of the data frame.

20. The non-transitory computer readable medium according to claim 15, wherein the CG information is further for configuring the one or more CG transmission occasions allowed to be skipped.

21. A communication method, comprising:

sending configured grant (CG) information to a terminal, wherein the CG information is for configuring one or more CG transmission occasions, and the one or more CG transmission occasions are used for uplink data transmission;

receiving indication information from the terminal, wherein the indication information indicates that uplink data transmission will not be performed on N CG transmission occasions of the one or more CG transmission occasions, and N is a positive integer; and skipping uplink data reception from the terminal on the N CG transmission occasions.

22. The method according to claim 21, wherein the indication information comprises CG transmission occasion quantity information, and the CG transmission occasion quantity information indicates N.

23. The method according to claim 21, wherein the indication information is comprised in uplink control information (UCI).

24. The method according to claim 23, wherein the UCI is carried on a physical uplink shared channel (PUSCH).

25. The method according to claim 21, wherein the method further comprises:

allocating, for use by another terminal other than the terminal, all or some resources corresponding to the N CG transmission occasions.

26. The method according to claim 21, wherein the CG information is further for configuring the one or more CG transmission occasions allowed to be skipped.

27. A non-transitory computer readable medium storing instructions that are executable by a computer, the non-transitory computer readable medium is applied to a first communication apparatus, and the instructions comprise instructions for:

sending configured grant (CG) information to a terminal, wherein the CG information is for configuring one or more CG transmission occasions, and the one or more CG transmission occasions are used for uplink data transmission;

receiving indication information from the terminal, wherein the indication information indicates that uplink data transmission will not be performed on N CG transmission occasions of the one or more CG transmission occasions, and N is a positive integer; and skipping uplink data reception from the terminal on the N CG transmission occasions.

28. The non-transitory computer readable medium according to claim 27, wherein the indication information is comprised in uplink control information (UCI).

29. The non-transitory computer readable medium according to claim 28, wherein the UCI is carried on a physical uplink shared channel (PUSCH).

30. The non-transitory computer readable medium according to claim 27, wherein the CG information is further for configuring the one or more CG transmission occasions allowed to be skipped.

* * * * *